United States Patent
He et al.

(10) Patent No.: US 12,298,996 B2
(45) Date of Patent: *May 13, 2025

(54) FACILITATING DATA TRANSFORMATIONS

(71) Applicant: Microsoft Technology Licensing, LLC, Redmond, WA (US)

(72) Inventors: Yeye He, Redmond, WA (US); Kris K. Ganjam, Redmond, WA (US); Vivek Ravindranath Narasayya, Redmond, WA (US); Surajit Chaudhuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,490

(22) Filed: Sep. 28, 2023

(65) Prior Publication Data

US 2024/0028607 A1    Jan. 25, 2024

Related U.S. Application Data

(63) Continuation of application No. 16/847,091, filed on Apr. 13, 2020, now Pat. No. 11,809,442, which is a (Continued)

(51) Int. Cl.
*G06F 16/25* (2019.01)
*G06F 16/21* (2019.01)
(Continued)

(52) U.S. Cl.
CPC .......... *G06F 16/258* (2019.01); *G06F 16/211* (2019.01); *G06F 16/245* (2019.01); *G06F 21/604* (2013.01); *G06N 5/025* (2013.01)

(58) Field of Classification Search
CPC ..... G06F 16/211; G06F 16/245; G06F 16/258
(Continued)

(56) References Cited

U.S. PATENT DOCUMENTS

| 8,510,302 B2* | 8/2013 | Sweeney | G06F 16/35 |
| | | | 707/758 |
| 8,996,442 B2* | 3/2015 | Gould | G06F 16/211 |
| | | | 706/47 |

(Continued)

OTHER PUBLICATIONS

Non-Final Office Action mailed on Dec. 4, 2024, in U.S. Appl. No. 18/075,365, 10 pages.
(Continued)

*Primary Examiner* — Shahid A Alam
(74) *Attorney, Agent, or Firm* — Shook, Hardy & Bacon L.L.P.

(57) ABSTRACT

Methods, computer systems, computer-storage media, and graphical user interfaces are provided for facilitating data transformations, according to embodiments of the present invention. In one embodiment, a set of example values including example input values that indicate data values to be transformed and example output values that indicate a desired form in which to transform data. Based on the set of example values, a data transformation function that is relevant to the set of example values is identified. The data transformation function is used to generate a transformation program to transform the example input values to the desired form in which to transform data. A suggestion of the transformation program can be provided to a user device, wherein selection of the transformation program suggestion results in a data transformation.

20 Claims, 25 Drawing Sheets

Related U.S. Application Data continuation of application No. 15/271,154, filed on Sep. 20, 2016, now Pat. No. 10,621,195.

(51) Int. Cl.
*G06F 16/245* (2019.01)
*G06F 21/60* (2013.01)
*G06N 5/025* (2023.01)

(58) Field of Classification Search
USPC .................................................. 707/756
See application file for complete search history.

(56) References Cited

U.S. PATENT DOCUMENTS

| | | | |
|---|---|---|---|
| 10,776,380 B2* | 9/2020 | He | G06F 16/90344 |
| 11,170,020 B2* | 11/2021 | He | G06F 16/258 |
| 11,836,537 B2 | 12/2023 | Walters et al. | |
| 2002/0133504 A1* | 9/2002 | Vlahos | G06F 16/256 |
| 2005/0203933 A1 | 9/2005 | Chaudhuri | |
| 2007/0239762 A1* | 10/2007 | Farahbod | G06F 40/151 |
| | | | 717/109 |
| 2007/0250762 A1* | 10/2007 | Mansfield | G06F 16/40 |
| | | | 715/205 |
| 2007/0255958 A1* | 11/2007 | Schmidt | G06F 21/335 |
| | | | 713/183 |
| 2011/0161916 A1* | 6/2011 | Thomson | G06F 16/88 |
| | | | 717/105 |
| 2011/0225176 A1* | 9/2011 | Siegel | G06F 16/25 |
| | | | 707/756 |
| 2011/0265060 A1* | 10/2011 | Fritzsche | G06F 8/10 |
| | | | 717/104 |
| 2012/0011152 A1* | 1/2012 | Gulwani | G06F 8/51 |
| | | | 707/771 |
| 2012/0192051 A1* | 7/2012 | Rothschiller | G06F 16/26 |
| | | | 715/217 |
| 2012/0254162 A1* | 10/2012 | Asadullah | G06F 16/3331 |
| | | | 707/E17.069 |
| 2013/0054605 A1* | 2/2013 | Yeh | G06F 16/258 |
| | | | 707/E17.046 |
| 2013/0103705 A1 | 4/2013 | Thomas | |
| 2013/0204874 A1* | 8/2013 | Frey | G06F 16/353 |
| | | | 707/737 |
| 2014/0032571 A1* | 1/2014 | Caskey | G06N 3/08 |
| | | | 707/756 |
| 2015/0081396 A1* | 3/2015 | Miller | G06F 16/24 |
| | | | 707/754 |
| 2015/0242408 A1* | 8/2015 | Frohock | G06F 16/23 |
| | | | 707/749 |
| 2015/0242409 A1* | 8/2015 | Frohock | G06F 16/2456 |
| | | | 707/620 |
| 2015/0254322 A1* | 9/2015 | Ma | G06F 16/182 |
| | | | 707/603 |
| 2016/0048698 A1* | 2/2016 | Sahu | G06F 16/21 |
| | | | 707/783 |
| 2016/0092474 A1* | 3/2016 | Stojanovic | G06F 16/211 |
| | | | 707/805 |
| 2016/0092476 A1* | 3/2016 | Stojanovic | G06F 3/04883 |
| | | | 707/805 |

OTHER PUBLICATIONS

Non-Final Office Action mailed on Dec. 11, 2023 in U.S. Appl. No. 17/015,594, 16 pages.
Non-Final Office Action mailed on Jul. 25, 2024, in U.S. Appl. No. 17/015,594, 16 pages.
Notice of Allowance mailed on Feb. 20, 2020, in U.S. Appl. No. 15/295,858, 10 pages.
Notice of Allowance mailed on Jul. 8, 2021, in U.S. Appl. No. 15/343,704, 11 pages.
Notice of Allowance mailed on Jul. 8, 2021, in U.S. Appl. No. 15/343,720, 11 pages.
Notice of Allowance mailed on May 8, 2020, in U.S. Appl. No. 15/331,690, 7 pages.

* cited by examiner

800

| | A |
|---|---|
| 1 | Transaction Date |
| 2 | Wed, 12 Jan 2011 11:10:41 |
| 3 | Thu, 15 Sep 2011 02:27:21 |
| 4 | Mon, 17 Sep 2012 09:30:55 |
| 5 | 2010-Nov-30 |
| 6 | 2011-Jan-11 |
| 7 | 2011-Jan-12 |
| 8 | 2010-Dec-24 |
| 9 | 9/22/2011 |
| 10 | 7/11/2012 |
| 11 | 2/12/2012 |
| 12 | 3/31/2013 |
| 13 | 6/1/2009 12:01 |
| 14 | 2/26/2007 18:37 |
| 15 | 1/4/2011 14:33 |
| 16 | |
| 17 | |
| 18 | |
| 19 | |

810

Panama  Tools ▼  Help ▼

Suggestions

Hybrid Transformation 1 System.DateTime.Parse(System.String) —820

Hybrid Transformation 2 System.Convert.ToDateTime(System.String) —824

Undo  Reload  Go

FIG. 8A

| | A | B |
|---|---|---|
| 1 | Transaction Date | |
| 2 | Wed, 12 Jan 2011 11:10:41 | 2011-01-12, Wednesday |
| 3 | Thu, 15 Sep 2011 02:27:21 | 2011-09-12, Thursday |
| 4 | Mon, 17 Sep 2012 09:30:55 | 2012-09-17, Monday |
| 5 | 2010-Nov-30 | 2010-11-30, Tuesday |
| 6 | 2011-Jan-11 | 2011-01-11, Tuesday |
| 7 | 2011-Jan-12 | 2011-01-12, Wednesday |
| 8 | 2010-Dec-24 | 2010-12-24, Friday |
| 9 | 9/22/2011 | 2011-09-22, Thursday |
| 10 | 7/11/2012 | 2012-07-11, Wednesday |
| 11 | 2/12/2012 | 2012-02-12, Sunday |
| 12 | 3/31/2013 | 2013-03-31, Sunday |
| 13 | 6/1/2009 12:01 | 2009-06-01, Monday |
| 14 | 2/26/2007 18:37 | 2007-02-26, Monday |
| 15 | 1/4/2011 14:33 | 2011-01-04, Tuesday |
| 16 | | |
| 17 | | |
| 18 | | |
| 19 | | |

| | A |
|---|---|
| 1 | Transaction Date |
| 2 | Wed, 12 Jan 2011 11:10:41 |
| 3 | Thu, 15 Sep 2011 02:27:21 |
| 4 | Mon, 17 Sep 2012 09:30:55 |
| 5 | 2010-Nov-30 |
| 6 | 2011-Jan-11 |
| 7 | 2011-Jan-12 |
| 8 | 2010-Dec-24 |
| 9 | 9/22/2011 |
| 10 | 7/11/2012 |
| 11 | 2/12/2012 |
| 12 | 3/31/2013 |
| 13 | 6/1/2009 12:01 |
| 14 | 2/26/2007 18:37 |
| 15 | 1/4/2011 14:33 |
| 16 | |
| 17 | |
| 18 | |
| 19 | |

| | A | B |
|---|---|---|
| 1 | Transaction Date | |
| 2 | Wed, 12 Jan 2011 11:10:41 | 2011-01-12, Wednesday |
| 3 | Thu, 15 Sep 2011 02:27:21 | 2011-09-12, Thursday |
| 4 | Mon, 17 Sep 2012 09:30:55 | 2012-09-17, Monday |
| 5 | 2010-Nov-30 | 2010-11-30, Tuesday |
| 6 | 2011-Jan-11 | 2011-01-11, Tuesday |
| 7 | 2011-Jan-12 | 2011-01-12, Wednesday |
| 8 | 2010-Dec-24 | 2010-12-24, Friday |
| 9 | 9/22/2011 | 2011-09-22, Thursday |
| 10 | 7/11/2012 | 2012-07-11, Wednesday |
| 11 | 2/12/2012 | 2012-02-12, Sunday |
| 12 | 3/31/2013 | 2013-03-31, Sunday |
| 13 | 6/1/2009 12:01 | 2009-06-01, Monday |
| 14 | 2/26/2007 18:37 | 2007-02-26, Monday |
| 15 | 1/4/2011 14:33 | 2011-01-04, Tuesday |
| 16 | | |
| 17 | | |
| 18 | | |
| 19 | | |

FACILITATING DATA TRANSFORMATIONS

CROSS-REFERENCE TO RELATED APPLICATIONS

This application is a continuation of U.S. application Ser. No. 16/847,091, filed Apr. 13, 2020, which itself is a continuation of U.S. application Ser. No. 15/271,154, filed Sep. 20, 2016 now issued as U.S. Pat. No. 10,621,195. The contents of each of which is incorporated herein by reference in its entirety.

BACKGROUND

Data analysts oftentimes desire to transform a set of data values to a particular data format (also sometimes referred to as data wrangling). For example, data may be collected in various formats or variations. To effectively analyze or consume the data, however, the collected data is desired to be transformed to a standard or common format. Upon transforming the diverse data to a consistent format, such transformed data can be analyzed (e.g., to collect statistics). Example data transformations include, for example, datetime conversions, address parsing, name conversions, etc.

Performing data transformations, however, is often difficult and time consuming. For example, because data might be collected in numerous, diverse formats, a different transformation may be applied to each of the different format types and, as such, result in an extensive amount of time to perform each of the transformations. In particular, a user may be required to manually search for, or develop, a data transformation operation or set of data transformation operations to apply to a collected data set in order to accomplish a uniform set of data values. In order to more efficiently perform data transformations, it is important that a user be able to effectively search for and/or utilize transformation operations that transform data as desired by the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating data transformations. Generally, transformation programs that perform data transformations can be dynamically generated based on example input and/or output values, for instance, provided via a user device. Based on the example values, a transformation engine can search a collection of transformation tools, such as transformation functions, to identify tools that can perform data transformations generally related to a desired data transformation. When an initial data transformation using an identified transformation tool does not result in a desired data format, a supplemental tool, such as a function, table, syntactic operator, or web service, can be used along with the initially identified transformation tool to generate a transformation program. Generated transformation programs can be ranked and provided as suggestions for performing data transformations. Based on a selection of a transformation program, the transformation program can be executed to produce transformed output values.

BRIEF DESCRIPTION OF THE DRAWINGS

The technology described herein is described in detail below with reference to the attached drawing figures, wherein:

FIGS. 8A-8B provide another exemplary graphical user interface associated with a data transformation, in accordance with aspects of the technology described herein;

FIG. 9A-9B provide another exemplary graphical user interface associated with a data transformation, in accordance with aspects of the technology described herein;

DETAILED DESCRIPTION

Figure 1:
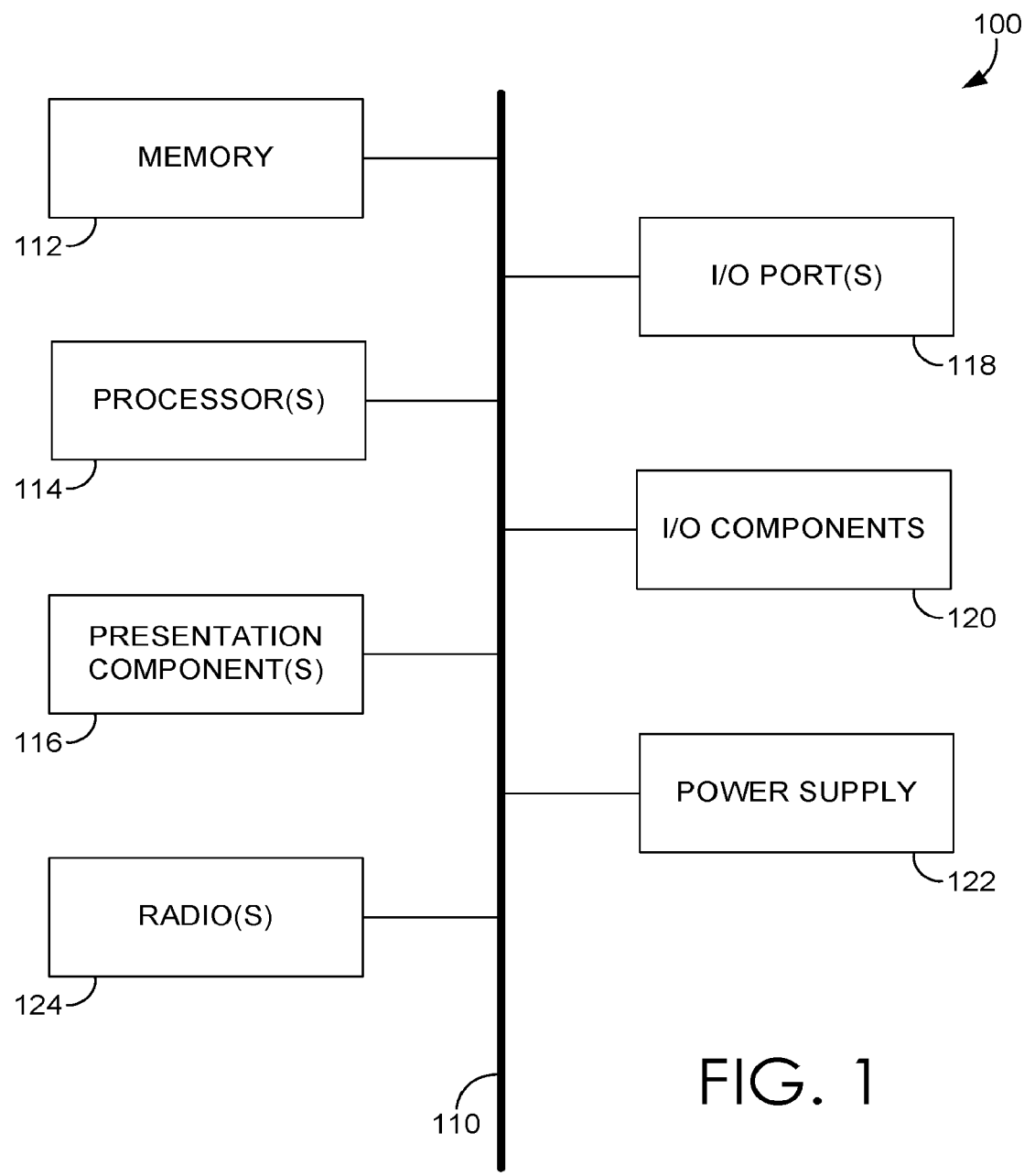
FIG. 1 is a block diagram of an exemplary computing environment suitable for use in implementing aspects of the technology described herein.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer storage media for, among other things, facilitating data transformations. Generally, at a high level, existing transformation tools that can be used to transform data can be collected and annotated. In particular, for instance, the web or an enterprise can be crawled to identify existing transformation tools that might be candidates for subsequent use in performing data transformations. Upon identifying such candidate transformation tools, the tools can be analyzed to identify characteristics or attributes associated with the tools, or the source from which the tools were identified. For instance, source code associated with transformation functions can be statically or dynamically analyzed to identify calling examples that can be input and/or output from the transformation function.

In accordance with receiving example values, such as example input values and example output values selected by a user, a transformation engine can use the annotations to search for transformation tools that are relevant to a desired data transformation. Any number of methods can be used to search for relevant transformation tools. Upon identifying and, in some cases, ranking transformation tools, tools deemed relevant can be used to generate a transformation program that can perform a data transformation. As can be appreciated, in many cases, existing transformation tools (e.g., transformation functions) alone do not perform the desired data transformation. Accordingly, supplemental transformation tools, such as functions, tables, services, and operators can be identified and applied in connection with the initially identified transformation tool to generate transformation programs. Such transformation programs can be ranked, for instance, based on attributes of the underlying transformation tools or sources associated therewith. In some cases, suggestions of the transformation programs can be provided to the user device for user selection of one of the transformation programs. Additionally or alternatively, transformed output values resulting from execution of a transformation program can be provided to the user device.

Accordingly, in one aspect of the present invention, a computing system having a processor; and computer storage memory having computer-executable instructions stored thereon which, when executed by the processor, configure the computing system to facilitate data transformations is provided. In one embodiment, the computer system receives example values including one or more example input values that indicate data values to be transformed and one or more example output values that indicate a desired form in which to transform data. Based on at least a portion of the example values, a data transformation function that is relevant to the example values is identified. Thereafter, a transformation program is generated, the transformation program uses the data transformation function and a supplemental transformation tool to transform the example input values to the desired form in which to transform data. A suggestion of the transformation program is then provided, wherein selection of the transformation program suggestion results in a data transformation.

In another aspect, a computer-implemented method for facilitating data transformations is provided. In embodiments, a set of example values is received including one or more example input values that indicate data values to be transformed and one or more example output values that indicate a desired form in which to transform data. Based on at least a portion of the set of example values, a data transformation tool that is relevant to the set of example values is identified. Thereafter, a transformation program is generated. Such a transformation program can use the data transformation tool and a supplemental transformation tool to transform the one or more example input values to the desired form in which to transform data. One or more transformed output values resulting from execution of the transformation program using example input values are provided.

In yet another aspect, one or more computer storage media having computer-executable instructions embodied thereon that, when executed by one or more processors, cause the one or more processors to perform a method for facilitating data transformations is provided. In embodiments, a set of example values is received including one or more example input values that indicate data values to be transformed and one or more example output values that indicate a desired form in which to transform data. The set of example values are analyzed to identify a data transformation function that is relevant to the transformation of the set of example values. The data transformation function is executed using an example input value to obtain an output value from the data transformation function. Based on a comparison of the output value resulting from execution of the data transformation to one of the example output values, a transformation tool is identified for using with the data transformation function such that the desired form in which to transform data is obtained. Thereafter, transformation program is generated using the data transformation function and the transformation tool. The transformation program being usable to transform the at least a portion of the one or more example input values to the desired form in which to transform data.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Referring to the drawings in general, and initially to FIG. 1 in particular, an exemplary operating environment for implementing aspects of the technology described herein is shown and designated generally as computing device 100. Computing device 100 is just one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, and a radio(s) 124. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 112 includes computer storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O port(s) 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as stereoscopic camera systems, infrared camera systems, RGB camera systems, and combinations of these, for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include radio(s) 124. The radio 124 transmits and receives radio communications. The computing device may be a wireless terminal adapted to receive communications and media over various wireless networks. Computing device 100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

Overview of Exemplary Environments for Facilitating Data Transformations

Figure 2:
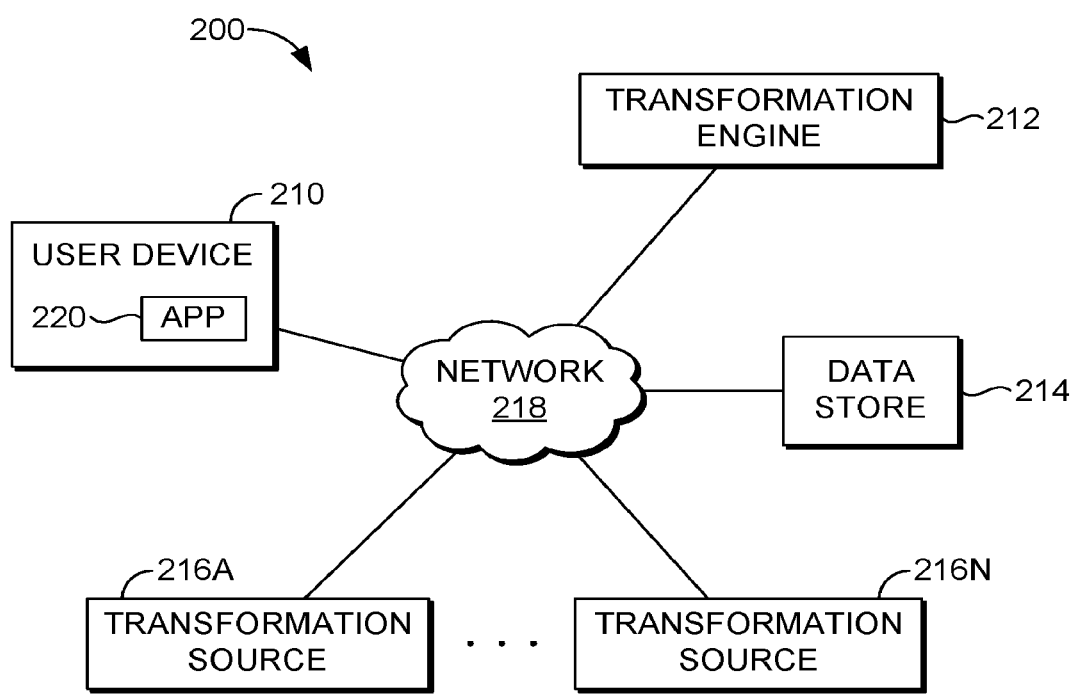
FIG. 2 is a block diagram of an exemplary system for facilitating data transformations, suitable for use in implementing aspects of the technology described herein.

Referring now to FIG. 2, a block diagram of an exemplary network environment 200 suitable for use in implementing embodiments of the invention is shown. Generally, the system 200 illustrates an environment suitable for transforming data that, among other things, searches for transformation tools, generates transformation programs, and provides transformation output (e.g., transformation program suggestions and/or transformed output values). The network environment 200 includes a user device 210, a transformation engine 212, a data store 214, and transformation sources 216a-216n (referred to generally as transformation source(s) 216). The user device 210, the transformation engine 212, the data store 214, and the transformation sources 216a-216n can communicate through a network 218, which may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment 200 be interpreted as having any dependency or requirement related to any single component or combination of components illustrated therein. For example, the user device 210 and transformation sources 216a-216n may be in communication with the transformation engine 212 via a mobile network or the Internet, and the transformation engine 212 may be in communication with data store 214 via a local area network. Further, although the environment 200 is illustrated with a network, one or more of the components may directly communicate with one another, for example, via HDMI (high-definition multimedia interface), DVI (digital visual interface), etc. Alternatively, one or more components may be integrated with one another, for example, at least a portion of the transformation engine 212 and/or data store 214 may be integrated with the user device 210.

The user device 210 can be any kind of computing device capable of facilitating data transformations. For example, in an embodiment, the user device 210 can be a computing device such as computing device 100, as described above with reference to FIG. 1. In embodiments, the user device 210 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 220 shown in FIG. 2. The application(s) may generally be any application capable of facilitating a data transformation. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

In embodiments, data transformations may be initiated and/or presented via an application 220 operating on the user device 210. In this regard, the user device 210, via an application 220, might allow a user to initiate a data transformation and to obtain, in response to initiating a data transformation, transformed output and/or transformation program suggestions that can be used to transform data. The user device 210 can include any type of application that facilitates data transformations. An application may be a stand-alone application, a mobile application, a web application, or the like. One exemplary application that may be used for data transformation includes a spreadsheet application. In some cases, the functionality described herein may be integrated directly with an application or may be an add-on, or plug-in, to an application.

User device 210 can be a client device on a client-side of operating environment 200, while transformation engine 212 can be on a server-side of operating environment 200. Transformation engine 212 may comprise server-side software designed to work in conjunction with client-side software on user device 210 so as to implement any combination of the features and functionalities discussed in the present disclosure. An example of such client-side software is application 220 on user device 210. This division of operating environment 200 is provided to illustrate one example of a suitable environment, and it is noted there is no requirement for each implementation that any combination of transformation engine 212 and user device 210 to remain as separate entities.

In an embodiment, the user device 210 is separate and distinct from the transformation engine 212, the data store 214, and the transformation sources 216 illustrated in FIG. 2. In another embodiment, the user device 210 is integrated with one or more illustrated components. For instance, the user device 210 may incorporate functionality described in relation to the transformation engine 212. For clarity of explanation, we will describe embodiments in which the user device 210, the transformation engine 212, the data store 214, and the transformation sources 216 are separate, while understanding that this may not be the case in various configurations contemplated within the present invention.

As described, data transformations change or modify data from one form to another. Data transformations may be initiated at the user device 210 in any manner. For instance, upon selection of example input and/or output values, a "begin" or "search" function button might be selected, for example, by a user via the user interface. By way of example only, a user might select to search for a relevant data transformation program or to perform a data transformation in association with data values. As another example, data transformations might be automatically initiated. For instance, upon detecting an intent to perform a data transformation, a data transformation(s) can be automatically initiated to result in transformed data output, as described in more detail below.

In some cases, one or more example input values and/or example output values are selected to facilitate data transformation. For instance, example input values and/or example output values can be used to search for appropriate transformation tools, generate a transformation program, and/or perform a data transformation. An example input value refers to an example of data desired or selected to be transformed. An example output value refers to an example of data corresponding with a form or format to which to transform a data value. Any number of example input values and/or example output values can be specified or designated. For instance, in some cases, each of the values desired to be transformed can be selected, while a minimal number (e.g., 1, 2, 3) of example output values might be selected.

Example input and/or output values can be selected in any number of ways. For instance, a user might use a mouse, selector, touch input, or the like to specify example input values and/or output values. As another example, example input and/or output values might be automatically selected. By way of example only, assume a user inserts a new column adjacent to another existing column and inserts a value into the new column. In such a case, the values in the existing column may be automatically selected as the example input values while the value inserted into the new column may be selected as an example output value.

Example input and/or output values can be provided as, or as part of, a transformation query to initiate a data transformation process. For instance, example input and/or output values might be included as a transformation query to result in one or more transformation program suggestions that can be used to transform data. For example, upon selecting one or more example input and/or output values as well as a "begin" or "go" button or icon, the selected example input and/or output values can be provided to the transformation engine 212 for use in generating transformation program suggestions.

The user device 210 communicates with the transformation engine 212 to facilitate a data transformation. In embodiments, for example, a user utilizes the user device 210 to initiate a search for available transformation programs via the network 218. For instance, in some embodiments, the network 218 might be the Internet, and the user device 210 interacts with the transformation engine 212 to obtain relevant transformation programs, or suggestions thereof. In other embodiments, for example, the network 218 might be an enterprise network associated with an organization. In these embodiments, the user device 210 can interact with the transformation engine 212 to search for transformation programs stored on or composed from various nodes within the enterprise network. It should be apparent to those having skill in the relevant arts that any number of other implementation scenarios may be possible as well.

With continued reference to FIG. 2, the transformation engine 212 generally provides data transformation services. Generally, the transformation engine 212 searches for transformation tools relevant to a desired data transformation and uses such tools to generate a transformation program(s) to perform the desired data transformation. The transformation program(s) can be provided as a transformation program suggestion(s) to the user device 210 and/or used to generate transformed output values. The transformation engine 212, according to embodiments, can be implemented as server systems, program modules, virtual machines, components of a server or servers, networks, and the like.

As described, the transformation engine 212 may perform a search for a transformation tool(s) to utilize for data transformation. As such, the transformation engine 212 may be or include, for example, a search engine, a crawler, or the like. A search for a relevant transformation tool(s) can be triggered based on a transformation query submitted via the user device 210, or another component.

In embodiments, the transformation engine 212 receives transformation queries initiated via the user device 210. Transformation queries received from a user device, such as user device 210, can include transformation queries that were manually or explicitly input by the user (input queries) as well as transformation queries that were automatically generated. By way of example, a transformation query might be specified by a user based on the user selecting an example input value(s) and/or an example output value(s), selecting a "transformation" button, and/or the like. Transformation queries can additionally or alternatively be automatically generated and received at the transformation engine 212. For instance, upon creating a new column and inserting a data value, a transformation query might be automatically triggered. As another example, a background process might detect a scenario in which a consistent format might be desired and, thereafter, automatically initiate a transformation query to either provide transformation program suggestions, or transformed output suggestions. For instance, upon recognizing heterogeneous formats used within a column of data, a transformation might be automatically initiated to provide a transformation program suggestion that can transform the data to a consistent format, or provide transformed output suggestions to standardize the data format. Generally, the transformation engine 212 can receive transformation queries from any number of devices.

In accordance with receiving a transformation query (e.g., via the user device 210), the transformation engine 212 can perform a search for relevant transformation tools. As described, a transformation tool refers to any type of tool that can be used to facilitate a data transformation. In this way, a transformation tool can be used to convert or transform data from one format to another. A transformation tool can be a transformation function, a transformation table, a transformation service, a transformation operator, or a combination thereof. A transformation function refers to any function, source code, or code structure that can be used to transform data from one form to another. In embodiments, a transformation function may perform a semantic transformation, a syntactic transformation, or a combination thereof. A transformation table refers to any table that provides an original set of data and a transformed set of data. A transformation service refers to a service, such as a web service, that is used to perform a data transformation. For example, an exemplary web service is BING® Maps (a service available from Microsoft Corporation of Redmond, Washington), for which an address string can be provided and a structured, segmented field(s) for that address can be provided in return. A transformation operator refers to an operator that can be used to perform a syntactic transformation. For instance, a transformation operator may be in the form of a concatenation operator, a split operator, a numeric operator (e.g., number formatting, rounding, scientific notation, linear transformation, unit conversion), or the like.

As described in more detail below, to obtain transformation tools from which to search for use in performing a data transformation, the transformation engine 212 can identify and collect transformation tools from various sources, such as transformation sources 216a-216n. In this regard, the transformation engine 212 can crawl various sources to identify candidate transformation tools that can be used in performing a data transformation. The identified transformation tools can be stored, for example, in the data store 214. Further, to effectively search for relevant transformation tools, the transformation engine 212 might annotate the transformation tools. In this manner, collected transformation tools can be analyzed to identify annotations for use in searching and/or ranking the transformation tools. Various annotations associated with the performance and use of transformation tools can be generated. For example, annotations for a transformation function may include calling examples, that is, examples of values or strings input to and/or output from the particular transformation function.

In accordance with receiving a transformation query (e.g., from user device 210), the transformation engine 212 can search for relevant transformation tools using the corresponding tool annotations. By way of example only, relevant transformation functions might be identified and ranked based on example input values and/or example output values compared to calling input and/or output examples associated with transformation functions. Additional or alternative analysis might be applied to identify and/or rank relevant transformation tools, some of which are described in more detail herein.

The transformation engine 212 can use a relevant transformation tool(s) to obtain or generate a transformation program. A transformation program refers to any computer program that can be used to perform a data transformation. In some cases, a transformation tool deemed relevant can be used as a transformation program to perform a data transformation. For example, in the event a transformation tool operates to perform a desired transformation, the transformation tool (e.g., a function) may be provided as a transformation program suggestion. In other cases, a transformation tool deemed relevant can be used to generate a transformation program that achieves a desired data transformation. By way of example, in some cases, a transformation tool, such as an existing transformation function, may generally be relevant to a desired data transformation, but not result in the desired data transformation (e.g., as indicated by example output values provided by a user). As such, an additional or supplemental transformation tool might be available or generated to achieve a desired data transformation. For instance, a transformation operator that can apply a syntactical data transformation may be identified and applied in conjunction with the transformation tool to achieve a desired data transformation.

Upon identifying or generating transformation programs that satisfy or are relevant to the transformation query, the transformation engine 212 can return a set of one or more transformation output, such as transformation program suggestions and/or transformed output values, to the user device 210. Transformation output generally refers to output associated with a data transformation. A transformation program suggestion refers to a suggestion of a transformation program that can be used to transform data. Such transformation program suggestions may be displayed by way of a graphical interface. A user may select a transformation program suggestion to view data transformation results, or a preview thereof.

A transformed output value refers to an output value resulting from application of a transformation program to transform data. Such transformed output values may be displayed by way of a graphical user interface. Transformed output values might be provided in response to a user input (e.g., selection of a transformation program suggestion) or automatically. For instance, a transformation program may be automatically used to perform a data transformation in accordance with receiving a transformation query and generating a transformation program to apply to selected example input values. A transformation program generated for the specific data values can be automatically applied to generate desired output values.

Figure 3:
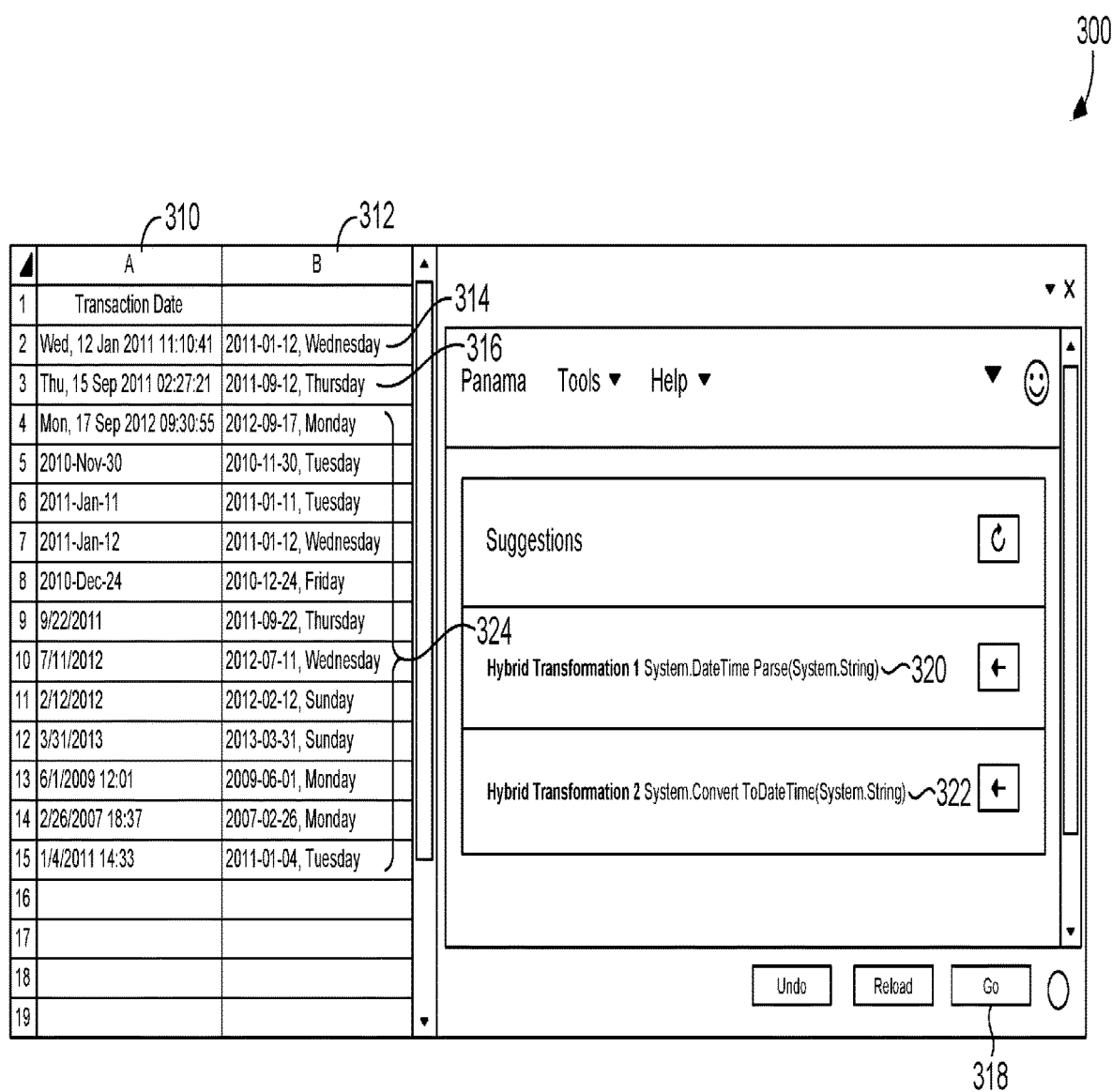
FIG. 3 is an exemplary graphical user interface associated with a data transformation, in accordance with aspects of the technology described herein.

By way of example only, and with reference to FIG. 3, FIG. 3 illustrates an example user interface 300 associated with a data transformation. As illustrated, column A 310 represents various formats of dates on which particular transactions occurred. To perform a data transformation in accordance with embodiments of the present invention, assume a user creates a new column B 312 adjacent to the various date formats. Further assume that the user enters or inputs two sample outputs in a desired format, example output value 314 and example output value 316. Upon selecting the "go" button 318, various collected transformation tools, such as functions and tables, can be searched to identify relevant transformation tools. Relevant transformation tools can be identified, for instance, using example input values of column A 310 and example output values 314 and 316. As can be appreciated, the output generated by a particular transformation tool, such as a transformation function, may not match the example output value(s) provided by a user (e.g., example output values 314 and 316). As such, a relevant transformation tool can be used as an underlying tool (e.g., function) to dynamically compose a transformation program that produces transformed output values matching the example output value 314 and the example output value 316. As shown, two composed transformation programs 320 and 322 are provided as suggestions. Such transformation program 320 and 322 can be represented in any manner, such as via an indication of the underlying transformation tool used to generate the transformation program.

Now assume the user selects, or hovers over, a particular transformation program suggestion, such as transformation program suggestion 320. In such a case, transformed output values 324, or preview thereof, can be provided corresponding with the remaining input values. In some cases, the source code of the composed transformation program is available, or can be provided, to a user such that the user can review and/or modify the source code. For example, a user may select a transformation program suggestion, such as transformation program 320, to view the source code. This is only one example of potential user interface aspects of embodiments of the present invention and is not intended to limit the scope of the invention. Other examples are provided herein, for example, with reference to FIGS. 7-9.

Figure 4:
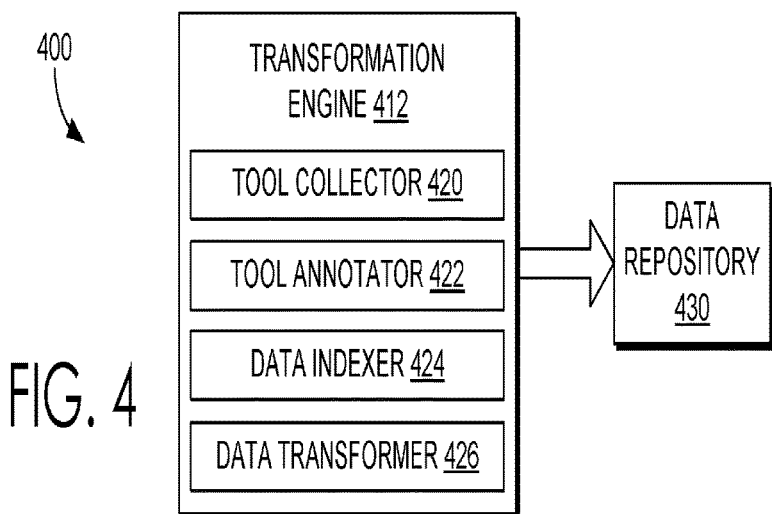
FIG. 4 is an example transformation engine in accordance with aspects of the technology described herein.

Turning now to FIG. 4, FIG. 4 illustrates an example transformation engine 412. In embodiments, the transformation engine 412 includes a tool collector 420, a tool annotator 422, a data indexer 424, and a data transformer 426. According to embodiments of the invention, the transformation engine 412 can include any number of other components not illustrated. In some embodiments, one or more of the illustrated components 420, 422, 424, and 426 can be integrated into a single component or can be divided into a number of different components. Components 420, 422, 424, and 426 can be implemented on any number of machines and can be integrated, as desired, with any number of other functionalities or services.

The transformation engine 412 can communicate with the data repository 430. The data repository 430 is configured to store various types of information used by the transformation engine 412. In embodiments, the transformation engine 412 provides transformation data to the data repository 430 for storage, which may be retrieved or referenced by the transformation engine 412. Examples of types of information stored in data repository 430 may include, for example, example input values, example output values, transformation functions, transformation tables, transformation services, transformation operators, transformation tool sources (e.g., source code), transformation tool references, tool examples, calling input examples, calling output examples, transformation tool annotations, tool attributes (e.g., tool relationships, tool popularity, tool usage, tool author, tool difficult, etc.), indexes, or the like.

The tool collector 420 is generally configured to collect transformation tools, or references thereto. As described herein, a transformation tool might be a transformation function, a transformation table, a transformation service, a transformation operator, or the like. In embodiments, the tool collector 420 collects existing transformation tools from one or more sources, such as sources 216a-216n in FIG. 2. Transformation tools can be collected from various types of sources. For example, transformation tools can be collected from code libraries (e.g., GitHub and Stack Overflow), web sources (e.g., web pages having code or mapping tables, such as Wikipedia.com), web service calls (e.g., via REST APIs), electronic spreadsheets (e.g., functions and mapping tables), electronic documents, or the like. As can be appreciated, collected transformation tools, such as functions, can be in any language and are not required to be in a domain specific language.

To collect existing transformation tools, embodiments of the invention enable the tool collector 420 to crawl code and content from various sources, for example, on the web. To this end, the tool collector 420 can crawl web pages, electronic documents, etc. searching for functions, mapping tables, or other structured data that can be designated as a transformation tool.

To search for existing mapping tables, any type of sources can be crawled to identify mapping tables. For examples, web pages might be crawled to identify existing mapping tables, or other structured data. As another example, electronic documents and spreadsheets might be crawled and analyzed to identify mapping tables, or other structured data. As can be appreciated, in some embodiments, mapping tables can be generated and collected. For instance, data can be provided to a web service to obtain corresponding transformed output, which can then be used to generate a mapping table. Other methods can be employed to generate mapping tables, and implementations are not intended to be limited hereto.

To search for existing transformation functions, source code can be crawled to identify transformation functions. In particular, source code can be analyzed to identify any functions that take a string into an argument and then perform an operation in connection with that string (i.e., functions that take strings and return strings). The source code can be compiled to result in compiled or executable code that can additionally or alternatively be collected. In one embodiment, the source code can be compiled using a makefile. In some cases, source code may be identified that is in a non-compatible state. A non-compatible state refers to a state in which the source code cannot currently be compiled. For example, a snippet of code may be identified, for instance, in association with a website (e.g., Stack Overflow) at which a user may provide a code snippet as a solution to another user's question. In such a case, the code snippet might define the function, but not include dependencies of the function (e.g., assuming that the user posting the question understands what to do with the code snippet). In such cases, the tool collector 420 can analyze the code snippet to determine how to generate compilable code, that is, code that can be compiled. For example, one or more dependencies of a function may be determined, a language in which the function is written may be identified, etc. such that a code snippet can be converted to compilable code.

As another example, to search for existing transformation functions, a dynamic-link library (DLL) file can be crawled to identify transformation functions exposed by such a library. Other examples of methods for collecting transformation tools includes analyzing and/or collecting binary code, performing reverse compilation related to determining function calls in a library, etc.

In addition to searching for existing transformation tools, the tool collector 420 can be configured to generate or author new transformation tools, such as transformation functions. For example, a transformation function that takes a string and outputs a string can be generated from existing program code. Generating new transformation tools can occur in any number of manners. In one implementation, identified or collected source code can be used to generate new transformation functions. In particular, source code identified via a search (e.g., web search) can be analyzed to identify new functions. By way of example only, and without limitation, assume that a function (e.g., identified within test code) without any initial parameters or arguments, but with one or more constants, is identified. In such a case, a constant(s) (e.g., hard coded constant string) can be identified and used as a parameter or variable to the function to generate a new function. In this regard, a function that did not originally take arguments or parameters can be generated into a transformation function by transforming a constant corresponding with the function into a variable to take as input such that the new transformation function takes an argument or parameter including the constant. Although a constant within an original function is generally described herein as being used as input for generating a new transformation function, as can be appreciated, another parameter could also be used.

To identify source code from which new transformation functions can be made, the tool collector 420 may search for source code having a function(s) that does not take an argument but internally has a constant string. In some instances, to identify a constant for use as a parameter or variable, some setting up and/or calling another function may occur. For instance, a given function called can be analyzed to identify dependencies within the existing source code and to identify a subset of the code for use in generating other requirements of that function call. By way of example only, test code might exist that internally has a constant (e.g., x equals a constant phone number string), and the test code may call another function with that constant.

In some implementations, the source code is analyzed to identify combination of functions or locations at which to split functions in order to generate a new transformation function. For example, in some cases, a first function might be called, followed by calling a second function and then a third function to arrive at a desired output. In such a case, a sequence of the three functions can be identified and combined to generate a new transformation function. As another example, only a portion of an existing function may be identified as a new transformation function. In this case, the tool collector 420 can analyze where to split the function for use as the new function.

Upon identifying and collecting transformation tools, or references thereto, the tool collector 420 can store the collected tools or references in a data repository 430. A reference to a transformation tool provides an indication or pointer as to where to obtain the transformation tool. For example, in the case that a transformation tool is a web service, a reference providing an indication or link to the web service may be collected and stored in a repository. As another example, in the case the transformation tool is a mapping table or function, a reference providing an indication or link to the mapping table or function (e.g., via a URL) may be collected and stored in the repository. Alternatively or additionally to collecting and storing transformation tools, the tool collector 420 can store aspects of the source. For example, source code from which a transformation function is identified might be stored.

Although web searching has generally been described for identifying transformation tools, in accordance with some implementations, one or more enterprise searches may additionally or alternatively be employed to obtain transformation tools. An enterprise search refers to a search of a source(s) owned and/or operated by an organization. In embodiments, an enterprise search enables a search for transformation tools that include data unique to that enterprise. For instance, an enterprise search can result in various domain specific semantic functions that transform data generally associated with the enterprise. By way of example only, an enterprise search may include crawling electronic spreadsheets, electronic documents, databases, lookup tables, source code repository(s) having various functions, unique dynamic link libraries (DLLs), web services, etc. relevant to the enterprise. Performing enterprise searches can be beneficial as different industries and application domains often have domain-specific problems and proprietary data sets.

In accordance with receiving or identifying enterprise sources to search, transformation tools can be identified, extracted, and/or collected by the tool collector 420. In some cases, such transformation tools, or references thereto, might be stored among other external sources in data repository 430. In other cases, enterprise transformation tools may be stored remote and distinct from the other external sources. Enterprise transformation tools might generally be referred to here as transformation tools.

As will be described in more detail below, utilization of such enterprise transformation tools may vary in different embodiments, for example, depending on security levels associated with the enterprise transformation tools. For example, in some cases, enterprise transformation tools might be available for use in providing transformation program suggestions and/or transformed output values for the user(s) that provided the tool, for any users within the enterprise, for users within the domain or industry, for any user, etc.

In some embodiments, users may provide transformation tools or sources that are accessible to the tool collector 420 to search for transformation tools. In this regard, a user may upload or otherwise provide a transformation tool, or source code, mapping tables, or the like for use in searching for transformation tools. For instance, a user may upload source code utilized to perform a particular data transformation. In some cases, the user may also provide details pertaining to the transformation tool or source, such as the originator of the source, the type of data transformation performed, etc. Such transformation tools, or sources, can be stored, for example, in the data repository 430. User provided transformation tools might be available to users dependent on security levels associated with the provided tools.

Figure 5:
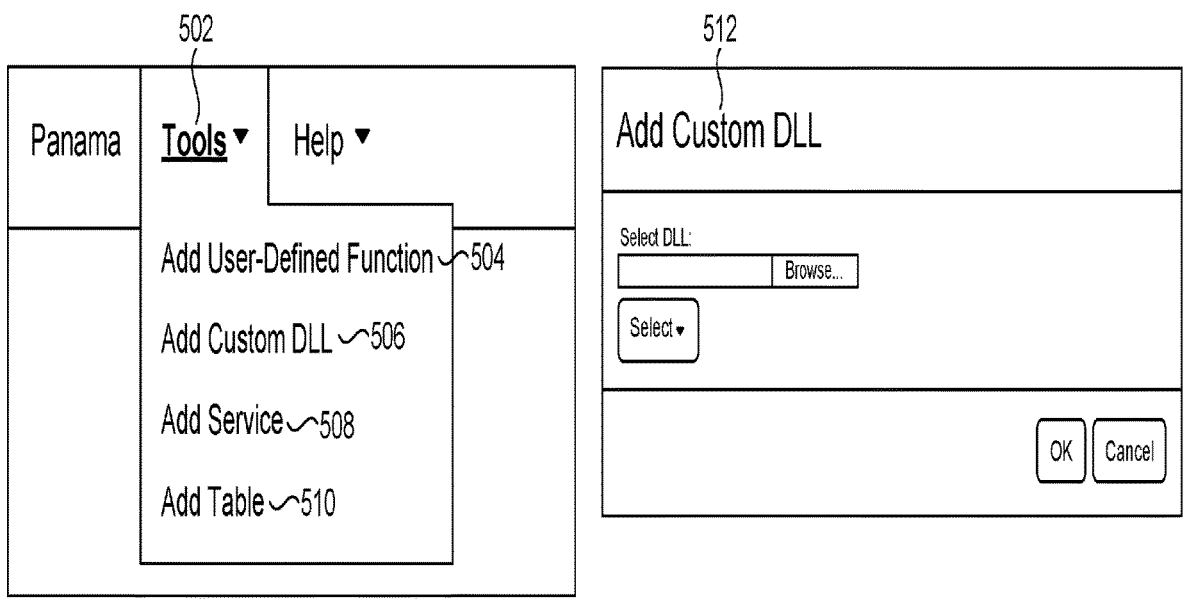
FIG. 5 is an exemplary graphical user interface enabling a user to input one or more transformation tools or sources, in accordance with aspects of the technology described herein.

FIG. 5 illustrates an exemplary user interface enabling a user to input one or more transformation tools, or sources, that can be accessed to subsequently search for transformation tools related to a particular transformation query. In particular, a user may select tools 502 and be presented with various types of transformation tools that may be added to a data repository. As shown, a user may select to add a user-defined function 504, a custom DLL 506, a service 508, or a table 510. Assume the user selects to add a custom DLL 506. In such a case, the user can be presented with the user interface 512 that enables the user to browse and select a custom DLL to be added as a new transformation tool, or source from which to search for transformation tools.

The tool annotator 422 generally generates or provides annotations for transformation tools. Annotating transformation tools enables the tools to be more efficiently identified and/or ranked for use in performing subsequent data transformations. To annotate transformation tools, the tool annotator 422 generally analyzes the transformation tool, and/or the source associated therewith, to identify characteristics associated with the transformation tool. Annotations can include any type of data or metadata characterizing, describing, or associated with the transformation tool, or source associated therewith. By way of example, annotations can include tool attributes or tool examples (e.g., input calling examples and/or output calling examples).

Tool examples refer to examples of input and/or output data associated with a transformation tool. In this regard, a tool input example refers generally to an example data that could be or has been transformed by a transformation tool. A tool output example refers generally to an example data that could or has resulted from a transformation performed by a transformation tool. Tool examples can correspond with any type of transformation tool, such as transformation functions, transformation tables, transformation services, and transformation operators, as described herein. Tool examples can be calling examples, table examples, service examples, and operator examples. Calling examples refer to examples of actual or proposed usage of a transformation function. In this way, calling examples facilitate an understanding of input values passed into a function as a parameter(s) and output values returned from the function. Input calling examples generally refer to values input to a function, while output calling examples generally refer to values returned from the function. Table examples refer to examples of actual or proposed entries or values in a table. Service examples refer to examples of actual or proposed values for input to and output from a transformation service. Operator examples refer to examples of actual or proposed values for input to and output from an operation.

Tool examples can be identified in any number of ways, some of which are described herein. For instance, calling examples can be identified using static analysis, dynamic analysis, user logging, or the like. In some cases, analyzing source code to identify calling examples may occur via static analysis. Static analysis might be performed, for instance, in cases that the source code being analyzed is test code. With static analysis, the source code can be inspected and parsed. For example, a compiler tool(s) can be used to inspect and parse the source code into an abstract syntax tree of various fields, such as functions, constants, etc. In accordance with the static analysis, constants being passed into a function can be identified and designated as input calling examples. For instance, assume that a function includes a constant that is in the form of a phone number. In such a case, a phone number can be identified as an input calling example.

By way of example only, assume a function exists that can parse data and output a date/time object. Further assume that source code associated with the function is analyzed to identify calling examples. For instance, test code that shows how to use the function or some sample code provided as a proper usage of the function might be identified in connection with the function and statically analyzed to identify calling examples. In such a case, a compiling tool(s) can be used to inspect the source code and generate an abstract syntax tree, parsing the source code into various code aspects, such as constants. Upon identifying a constant that is a string passed into the function, it can be recognized that a date/time string is being called by the date/time parse function. Accordingly, the date/time string can be identified as an input calling example.

Additionally or alternatively, in some cases, analyzing source code to identify calling examples may occur via dynamic analysis. With dynamic analysis, source code, or a portion thereof (e.g., transformation function), may be modified or injected with logging code that can be used to log arguments being passed into a transformation function. As such, when a program is being executed and uses a particular transformation function, an argument going into the function can be identified and designated as an input calling example. Further, the logging code can also be used to obtain output calling examples being generated from execution of the function.

Another implementation for obtaining calling examples includes utilization of user logging via the transformation engine. In this regard, as a user provides example input values and/or example output values and, thereafter, utilizes a transformation program to generate transformed data output, the input and/or output example values can be logged as calling examples for a function employed in association with the transformation program. In some cases, utilization of a transformation program to generate transformed output values might result in annotating a transformation function (used by the transformation program) with the data input to the transformation program and the transformed output values produced by the transformation program as calling examples. In embodiments, a user may confirm or verify transformed output values prior to the annotation or recordation of a transformation function with calling examples.

Input and/or output calling examples can be recorded as annotations in any manner. For instance, in some cases, a repository or data store can be used to store the recorded annotations. In some cases, as can be appreciated, calling examples can be aggregated for a function. In this regard, calling examples obtained in any manner can be aggregated, or stored collectively, when such calling examples are associated with a particular transformation function. Accordingly, calling examples obtained by a static analysis, dynamic analysis, and/or user logging analysis can be collected and aggregated in association with a corresponding transformation function. Aggregating calling examples enables a larger set of calling examples for a transformation function thereby resulting in a more robust manner to utilize the transformation function.

By way of example only, assume that a first test code calls a date/time function, and a second test code also calls the same date/time function. The date/time function included in the first test code can be analyzed separate from the date/time function included in the second test code. The calling examples identified via analysis of the first test code can be combined with the calling examples identified via analysis of the second test code. As can be appreciated, this example can be extrapolated out such that any number of instances of a function can be analyzed. For instance, each instance or place from which a function is called can be analyzed to aggregate all the calling examples associated therewith.

Recognizing various usage of a transformation function to obtain related calling examples can be performed in any manner. As one example, upon identifying a transformation function in one source, other sources can then be crawled or searched to identify such a transformation function within those sources. Analyzing a transformation function within multiple sources enables more raw data to be gathered in association with that function. Further, analyzing transformation functions associated with various sources can be performed over multiple programming languages. In some cases, to the extent diverse programming languages are used in association with a transformation function, annotations can be generated in a common format.

In some implementations, calling examples for a particular transformation function may be extended. To this end, a transformation function having a limited number of calling examples can be associated with a greater number of calling examples. Extending a number of calling examples for a particular transformation function can occur using other identified functions that may be similar. In one implementation, to identify a similar transformation function, a comparison of input and/or output calling examples can be compared between transformation functions. For instance, an analysis of one function may tend to have a set of calling examples of a first pattern, which is similar to pattern of calling examples associated with another function. In this way, functions may be deemed similar if a pattern derived from one function would work the same or similar if implemented in the other function. To the extent that functions are deemed similar, calling examples associated with both functions can be aggregated to extend the set of calling examples.

Another implementation for extending calling examples includes utilization of tables, such as web tables. By way of example only, assume a particular transformation function corresponds with only a three dates as input calling examples. Further assume that a web table is identified that has 1,000 dates listed in one of the columns including the three dates corresponding with the transformation function. In such a case, each of the additional dates in the web table can be used as calling examples for the transformation function, such as input calling examples for the transformation function.

Other transformation tools can also be annotated with tool examples. For example, a table can be annotated based on table examples. That is, data to be transformed and data that has been transformed can be captured and used as annotations for a table. As another example, a transformation service can be annotated based on service examples, such as data input into a transformation service and data output from a transformation service. For an operator, the data to be transformed and the data that has been transformed can be captured and used as annotations for an operator tool.

In addition or alternatively to annotating a transformation tool with tool examples, tool attributes annotations can be identified or generated. Tool attributes generally refer to any data or metadata associated with a transformation tool, or source associated therewith. As will be described in more detail below, tool attributes can be used to identify and/or rank transformation tools relevant to particular set of example values (example input and/or output values).

Various types of tool attributes include, for example, tool popularity (e.g., page rank), tool usage (e.g., hits or clicks), tool author, tool complexity, tool relationships, calling patterns, or the like. Identifying tool attributes and/or a particular set of tool attributes to identify may vary depending on a source or type of transformation tool. For example, assume a transformation tool is provided via Website A. In such a case, Website A might be analyzed to identify tool attributes such as tool popularity (e.g., because Website A is popular in terms of page rank of the Website, tool popularity might be ranked high). Further, visitors obtained via the website or the author of the function can be identified as tool attributes for the transformation tool. As another example, tool popularity might be high if a particular transformation tool, such as a mapping table, frequently appears on the web, appears on more than a threshold number of web sites, or is accessed more frequently. As another example, in an enterprise environment, tool popularity might be based on a number of employees that call a function, access a mapping table, etc.; or a number of electronic documents (e.g., spreadsheets) that call a function, etc. As yet another example, tools such as tables can be compared across the web to identify various attributes, such as what fraction of records are correct, does a particular table agree with most of the other tables that are similar, does a function agree with other functions that hare similar inputs and outputs, or the like.

A tool relationship attribute refers to data corresponding with a relationship or association between transformation tools. In this regard, a transformation tool can be identified as related to another transformation tool. For example, transformation tool A can be identified as related to transformation tool B when transformation tool A is called by transformation tool B, or transformation tool A is used to generate parameters to call transformation tool B. In addition to an indication of a relationship between transformation tools, further tool relationship attributes can be identified, for instance, based on frequency at which a transformation tool is called by another. As can be appreciated, relationships between functions can be learned, such as, is one function an inverse of another function (e.g., determine that call function 1 with a target and use the provided path expression to call function 2 to identify if the target is provided in response), or are two functions algebraically related.

Another tool attribute may be a tool pattern. A tool pattern refers to a pattern generalized from analysis of one or more tool examples, such as input and/or output calling examples. In this regard, a tool pattern generalizes or summarizes one or more tool examples as a pattern. Tool patterns can be represented in any manner, for instance, using numerals, alphabet characters, symbols, formats, etc. As will be described in more detail below, tool patterns can be used in some implementations to associate example values with the annotated data.

The data indexer 424 can use annotations, or other data, to generate indexes. Upon identifying annotations for transformation tools, such annotations can be used to generate one or more indexes. Generally, the generated data indexes can be used at run-time to search for and/or rank relevant transformation tools or programs. The data indexer 424 might generate indexes in an offline manner or in an online manner, in accordance with various implementations of the present invention.

As can be appreciated, any type of index or number of indexes might be generated. Embodiments described herein contemplate forward indexes, inverted indexes, etc. Further, any type of content may be included or referenced in an index. One example of a data index might be an example—tool index (e.g., a keyword index using tool examples, or portions thereof, as keyword tokens). In this regard, the data index can reference or associate transformation tools, such as functions, with tool examples, such as input and/or output calling examples. For instance, a function might be associated with calling examples that represent state names and abbreviations such that an example input value being a state name or abbreviation can utilize the index to search for or identify transformation functions that have the same token of state name or abbreviation.

Another example of a data index might be a pattern-tool index. In this example, the data index can reference or associate transformation tools, such as functions, with one or more tool patterns. As previously described, a tool pattern reflects or represents a pattern of one or more tool examples, such as input calling examples. Such tool patterns can be patterns generated by analysis of the calling examples that are accepted by each function, table examples included in a table, etc.

In generating indexes, in some embodiments, the data indexer 424 can compress data such that the indexes can operate more efficiently. In this manner, the data indexer 424 can identify and remove redundancy, such as redundant tool examples. For instance, with reference to an example—tool index, redundant calling examples can be identified and removed from an index, or not used in generating an index. In addition to or in the alternative to discarding duplicative tool examples, a tool example(s) can be removed based on an association to a duplicative pattern associated therewith. By way of example only, assume that two tool examples correspond with a same syntactic pattern. In such a case, one of the tool examples with that syntactic pattern can be removed. To this end, tool examples with a same or similar syntactic pattern can be considered redundant from a pattern distance perspective (or syntactic distance). For instance, calling examples that maintain distance to patterns that have been extracted from the calling examples can be reduced.

As another example, with reference to a pattern-tool index, redundant or duplicative patterns can be discarded from an index, or not used in generating an index. As described, such patterns might generalize tool samples associated with a transformation tool. By removing a duplicative pattern, the index is compressed. For instance, assume two input calling examples correspond with a same syntactic pattern. In such a case, one of the patterns can be discarded.

The data transformer 426 is generally configured to facilitate data transformation. At a high level, the data transformer 426 can facilitate data transformation by identifying and/or ranking transformation tools relevant to example input and/or output values, identifying and/or ranking transformation programs for use in performing data transformation, and the like.

The data transformer 426 can receive a set of example values. The set of example values generally include one or more example input values and one or more example output values. As previously described, the example values set can be selected or designated in any manner, for example, via a user device. Any number of example values can be received. In one embodiment, a minimal number of example output values might be received, such as, for instance, one example output value. As can be appreciated, an example output value is not needed for each example input value.

Based on the example input and/or output values, the data transformer 426 can search for one or more transformation tools (e.g., via a library or repository including a vast number of tools) that can be used to transform data that aligns, matches, or corresponds with the provided example output value(s). As such, the collected transformation tools, such as functions and/or tables, can be searched to identify any number of tools relevant to the desired data transformation.

In some cases, an identified transformation tool may be in form to perform the desired data transformation. For example, a function might exist that can take input and provide the desired output. In such cases, the transformation tool can be identified and provided as a transformation program that can perform the desired data transformation. In other cases, an identified transformation tool may facilitate a data transformation, but additional assistance may be needed to perform the desired data transformation. In such cases, a supplemental transformation tool can be identified or developed and used in association with the identified transformation tool to generate a transformation program that can perform the desired data transformation. As can be appreciated, and as described in more detail below with respect to FIG. 6, identified transformation tools and/or transformation programs can be ranked (e.g., based on a variety of features) such that tools and/or programs more relevant to a desired data transformation can be provided or utilized to transform data.

Upon obtaining one or more transformation programs that can be used to perform a desired data transformation, the relevant transformation program(s) can be provided as a suggestion and/or for use in performing the data transformation. In this regard, a user may select a transformation program suggestion to effectuate the desired data transformation, or preview the desired data transformation. In other cases, upon identifying a transformation program that can be used to perform a desired data transformation, such a transformation program may be automatically initiated to perform the data transformation. By way of example only, a desired data transformation might be automatically applied upon a user selecting a set of example values resulting in transformed output values being provided.

Figure 6:
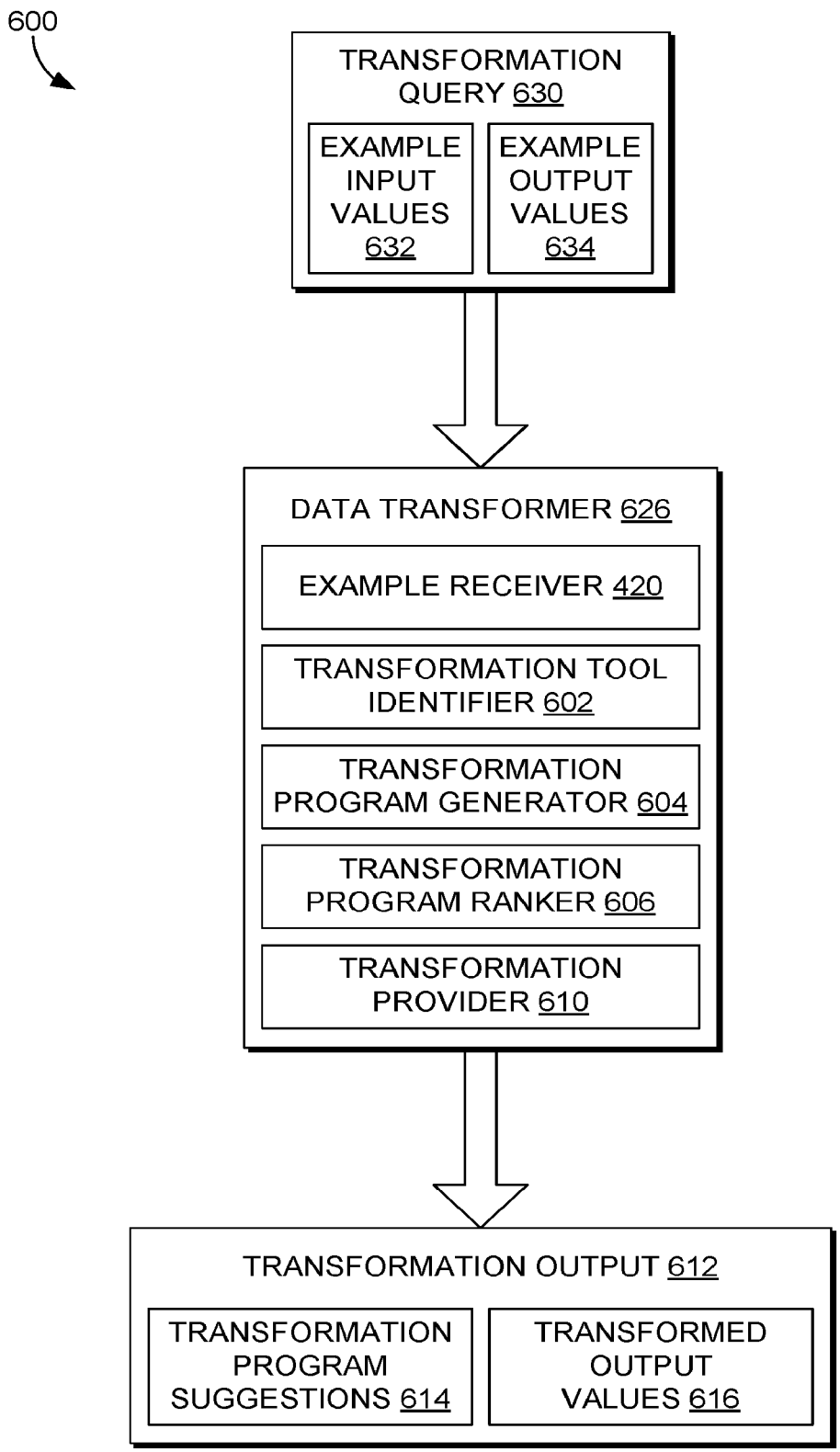
FIG. 6 provides an example of a data transformer environment, in accordance with aspects of the technology described herein.

FIG. 6 provides an example of a data transformer environment 600 that can be used to facilitate data transformations. As shown in FIG. 6, the data transformer 626 in FIG. 6 includes an example receiver 602, a transformation tool identifier 604, a transformation program generator 606, a transformation program ranker 608, and a transformation provider 610. According to embodiments of the invention, the data transformer 626 can include any number of other components not illustrated. In some embodiments, one or more of the illustrated components 602, 604, 606, 608, and 610 can be integrated into a single component or can be divided into a number of different components. Components 602, 604, 606, 608, and 610 can be implemented on any number of machines and can be integrated, as desired, with any number of other functionalities or services.

As shown, a transformation query 630 can be provided as input to the data transformer 626. The transformation query 630 might be received from a user device at which a data transformation is initiated. Generally, the transformation query 630 initiates a data transformation, or services associated therewith (e.g., obtaining program suggestions, etc.). To facilitate a data transformation or corresponding service, such as generation of a transformation program, the transformation query 630 can include example input value(s) 632 and example output value(s) 634. Such example values can be used by the data transformer 626 to understand a desired data transformation.

The example receiver 602 is configured to receive example values. A set of examples values generally include one or more example input values and one or more example output values. As shown, the example values, such as example input values 632 and example output values 634, can be received in association with a transformation query. As previously described, a set of example values can be selected or designated in any manner, for example, via a user device. For instance, a set of example values can be explicitly selected by a user or automatically selected. Any number of example values can be received. In one embodiment, a minimal number of example output values might be received, such as, for instance, one example output value. As can be appreciated, an example output value is not required for each example input value received.

Based on the example input and/or output values, the transformation tool identifier 604 generally identifies one or more transformation tools relevant to the set of example values. To identify one or more transformation tools relevant to the set of example values, generated annotations and/or indexes can be used. For instance, using example values and a function index, at runtime, an analysis can be performed to identify a smaller set of functions likely to be relevant. Various methods can be employed to search for and identify transformation tools relevant to a desired data transformation. Further, as can be appreciated, any type of transformation tool may be searched to initially identify relevant transformation tools.

In one implementation, to identify a relevant transformation tool(s) for use in performing a data transformation, a set of example input values can be compared to various input tool examples. In this regard, a transformation function (or other tool) can be identified as relevant when one or more example input values match or correspond with an input calling example associated with that transformation function. That is, transformation functions that have inputs the same or similar to example input values can be identified. Such transformation tools can be identified using annotations and/or a data index(s). As can be appreciated, in searching for relevant transformation tools, the example input values can be parsed into tokens. For instance, delimiters might be used to parse the example input values. Upon parsing the example input values, the parsed tokens can be used to search for relevant functions based on a particular parsed token matching or corresponding with a tool input example, or portion thereof. By way of example only, assume an example input value is in the form of "September 2016." In such a case, the example input value can be parsed into "September" and "2016," with each token compared against input calling examples to determine which functions have input calling examples most similar to the "September" token and/or "2016" token. In some cases, the set of tokens for an example input value can be used to identify a function that has a greatest overlap in association with the calling examples.

In an alternative or additional implementation, a set of example values, such as example input and/or output values, might be compared to various tool patterns to identify relevant transformation tools (e.g., functions). In such a case, the example values can be compared to the tool example patterns. Alternatively, the example values can be converted to an example pattern, that is, a pattern of the example values, and thereafter compared to tool patterns.

Another approach for identifying relevant transformation tools includes performing a nearest-neighbor search that searches for tool examples most similar, or nearest, to one or more example values, such as an example input values. By way of example only, assume that an example input value is received. In such a case, the example input value(s) can be compared to each calling input example to find calling input examples that are similar (e.g., exceed a similarity threshold) to the example input value(s). Such a nearest neighbor approach can be used to compare the values or patterns associated therewith.

Yet another approach to identify relevant transformation tools uses a hierarchical structure. In such an implementation, calling examples can be analyzed and formed into a hierarchical structure. A hierarchical structure can be in any form. As one example, a hierarchical structure may characterize data based on value type. For instance, numbers might be one data category, while alphabet characters might be another data category or level in the hierarchy. In response to receiving example values, such as example input values, the hierarchical tree of calling examples for a particular function can be traversed to identify functions that are relevant to the received example values.

Another hierarchical structure for identifying relevant transformation tools includes a tree-structure used to represent the input/output relationship for a transformation tool, such as a function. In this regard, a transformation tool is described as the difference between its calling input/output pairs using a tree representation. Upon receiving example values, the example input values and example output values can be described in a similar tree representation and compared with the tree structures representing the transformation tools. By way of example only, assume that a transformation function performs camel-casing (i.e., writes compound words or phrases such that each word or abbreviation in the middle of the phrase begins with a capital letter). In a tree structure, the transformation function can be described as only modifying casing. Now assume that the example input and output values also differ only by casing, as characterized by the tree structure. Accordingly, the transformation function can be identified as relevant to the desired data transformation based on the similarity in the tree structures. This approach can be particularly useful when the transformation tools, such as transformation functions, perform syntactic transformations.

Syntactic distance can also be used to identify relevant transformation tools. Syntactic distance refers to a distance or other indication of extent of syntactical difference. In this approach, syntactic distance can be used to compare values of example values and tool examples, or patterns associated therewith. For example, a pattern can be generated from example input values and a pattern can be generated for calling input examples. The two patterns can then be compared to identify a syntactic distance. Syntactic distance can be determined in any number of manners. As one example, a syntactic distance between a numerical value in one pattern and a numerical value in another pattern might be represented by a 0. Similarly, a syntactic distance between an alphabetical value in one pattern and an alphabetical value in another pattern might also be represented by a 0. While the values may be different, such a syntactic distance may be "0" to indicate lack of a syntactical difference. By comparison, a numerical value in one pattern compared to an alphabetical value in another pattern might result in a syntactic difference of 0.5. In this regard, types of data might be compared to one another (e.g., numerical, textual, symbolical, delimiter, length of data, format of data, etc). As such, in accordance with embodiments of the present invention, portions of each of the patterns can be compared to one another to determine syntactic distance. For instance, a first portion before a delimiter of one pattern can be compared to a first portion before a delimit of another pattern. Further, delimiters can be compared to one another. The syntactical differences might be aggregated to result in an aggregated syntactical difference between the patterns. Although syntactical distance is described in relation to patterns, as can be appreciated, a syntactical distance can similarly be determined based on the original values. Further syntactical distance can be used in association with an above approach (e.g., a hierarchical structure) to identify a relevant tool.

As can be appreciated, in association with identifying relevant transformation tools, the transformation tools can be ranked based on the analysis. In this regard, tool rankings can be generated based on, for example, an extent of similarity or degree of overlap between an example value(s) and a tool example(s). For example, given a set of tokens associated with example values, transformation functions can be ranked based on an amount of overlap with calling examples. In some cases, a tool ranking might occur using a single tool identification method described above, while in other cases, a tool ranking might occur based on a combination of tool identification methods. Further, input values, output values, or a combination thereof might be analyzed and/or ranked. For instance, in some implementations, a comparison of input values might be performed and used to rank various transformation tools, while in other implementations, a comparison of output values might be performed and used to rank various transformation tools. In comparing output values, the tool output examples, or patterns associated therewith, might be compared to the example output values provided by a user. In another case, output values can be generated using a transformation function and, thereafter, compared to the calling output examples.

Although example values are generally described above for use in identifying and/or ranking relevant transformation tools, as can be appreciated, alternative or additional data or annotations can be used to identify and/or rank transformation tools. For instance, prior transformation queries and utilized transformation tools can be monitored and used to improve tool rankings. Such prior queries and utilized transformation tools can be specific to a user, a specific group of users (e.g., users within an enterprise), or any user of the transformation engine, etc. As another example, transformation tools specific to an enterprise can be ranked, or weighted when ranked. As yet another example, additional tool attributes might be used to rank transformation tools. For example, a more frequently accessed or used transformation function may be weighted higher resulting in a higher ranking.

Upon identifying a transformation tool(s) deemed relevant to a desired data transformation, the transformation program generator 606 can generate a transformation program(s) using the transformation tool(s( ). As described, a transformation program is a program that can be used to perform a data transformation. Accordingly, transformation programs are generated that take input and can generate the desired output, as indicated by the example output values. As can be appreciated, the transformation program generator 606 may generate transformation programs for particular transformation tools, such as a set of highest ranked transformation tool. The specific set of highest ranked transformation tools can be determined in any manner. As one example, syntactic distances exceeding threshold (similarity threshold) may be designated as a high ranked transformation tool and, as such, used to generate a transformation program.

To generate a transformation program that utilizes a transformation tool to transform data, output generated from use of the transformation tool can be compared to the desired output (e.g., via the example output values) in order to determine additional transformations required to result in the desired output. In this regard, a transformation tool can be executed in accordance with one or more of the example input values. For instance, relevant transformation tools may be executed using the example input values for which corresponding example output values are provided.

As such, for each transformation tool, such as a transformation function, the transformation tool is executed with example input values to provide transformed data results. In some cases, the resulting transformed data is the desired transformed output. In such cases, the transformation tool can be provided as a transformation program. Generally, however, the resulting output will vary in some form from the desired data transformation. Accordingly, the transformation program generator 606 is used to generate a transformation program that supplements the transformation tool to arrive at the desired transformed output. In this regard, the transformation program generator 606 can execute a transformation tool with one or more example input values, and take the transformed output of that transformation tool to construct a program that provides the actual example output value provided, for instance, by the user. In executing a transformation tool, multiple columns of data might be generated and selectively used to generate a desired output.

By way of example only, assume that a date/time function is deemed relevant to a desired transformation. In such a case, the transformation program generator 606 can call the function with one or more example input values and obtain the resulting transformed output. For instance, the function can be called and generate ten outputs from each of the ten example input values. The resulting outputs can then be used to determine how to transform the resulting output into the example output(s) value, for instance, provided by a user.

As can be appreciated, various transformations may be required to achieve a desired transformed output. Accordingly, a supplemental transformation tool can be identified or generated and used in connection with the initial transformation tool to generate a transformation program. For instance, transformation operators can be used on top of a transformation function to generate a transformation program. Transformation operators can include, for instance, reordering operators, splitting operators (e.g., into substrings), concatenation operators (e.g., aggregating from different columns or fields), or other operators performing other syntax modifications, etc. By way of example, transformation operators can transform a full name to a desired first initial of first name, transform a full name into a first initial plus last name, split a full name based on a delimiter, such as space, or the like. Based on various transformation operators, the transformation program generator 606 can determine if there is a way to execute and generate exact output desired by the user.

In addition to using transformation operators to derive desired output, other supplemental transformation tools might be used. For example, a function or table might be referenced and used along with an initially identified transformation tool to generate a transformation program that appropriately transforms data. For instance, a mapping table might be identified and used along with an initially identified function to build a transformation program that can assist with syntactical composition. By way of example, if an example input value is state of Washington and WA is desired, a web table might be identified for use in transforming Washington into WA as output. Accordingly, mapping tables can be applied on top of a transformation function, or other original transformation tool, to generate a transformation program that results in a desired output. As another example, a sequence of function calls can be employed to arrive at a desired output. In this regard, a related function attributed can be used to determine likely chains of function calls or ways to complete parameters for function calls where additional parameter values are needed.

In one implementation, various supplemental transformation tools can be analyzed to efficiently arrive at the desired transformed output. For example, assume a transformation function is identified as relevant to a desired data transformation. Further assume that a transformation program can be generated using the transformation function and a first supplemental tool or using the transformation function and a second supplemental tool. As opposed to generating two separate transformation programs associated with the initial transformation function, the various supplemental transformation tools might be analyzed to determine which transformation program would operate more efficiently.

In one embodiment, to determine which supplemental transformation tool(s) might result in generation of a more efficient transformation program, a variety of supplemental transformation tools can be analyzed as providing transformations supplemental to the initial transformation tool. For instance, each supplemental transformation tool, or supplemental transformation tools identified as relevant, can be applied supplemental to an initially identified transformation tool. The output resulting from the various supplemental transformation tools can be compared to a desired output (e.g., example output value) to identify a partial match or partial match score. The partial match score indicates a measure of progress that each supplemental transformation tools adds to the initial transformation tool in terms of arriving at the desired output. Stated differently, the partial match score indicates a measure between a desired output and the intermediate output generated using the particular supplemental transformation tool. As such, rather than attempting every possible supplemental tool combination, this method considers an intermediate output. After the first level of supplemental transformation tools are analyzed and partial match scores are generated, the supplemental transformation tool associated with a greatest or highest match score, or otherwise indicating an output closest to the desired result, can be used. This process can be iteratively performed until the desired output is generated. In this regard, assume that a data split operator is determined as generating intermediate output that is most similar to the desired output. In such a case, an initial transformation tool and the data split operator can be used to analyze various second supplemental transformation tools that can be used. As can be appreciated, a partial match score can be determined in any number of manners, such as, for example, quantity of matching characters, portion of matching characters, overall length of the input that matches, etc.

Upon generating transformation programs, the transformation programs can be ranked, via transformation program ranker 608, in implementations that multiple transformation programs are generated. Transformation program ranker 608 can utilize any number or type of factors to rank the transformation programs. The transformation program ranker 608 may use various annotations, such as tool attributes, to rank the transformation programs. By way of example only, program ranking factors might include complexity of the transformation program, length of the transformation program (e.g., a minimum description length), execution speed, transformation tool usage, transformation tool popularity, latency, success rate, etc. In embodiments, the program ranker might incorporate previous tool rankings, or disregard previous tool rankings.

The transformation provider 610 is generally configured to output data related to performing data transformations. In this way, the transformation provider 610 might provide transformation output 612 in the form of transformation program suggestions 614 and/or transformed output 616 using one or more transformation programs. By way of example, assume that a set of transformation programs are generated based on received example input and output values designated by a user. Upon generating the transformation programs, transformation program suggestions indicating or representing the transformation programs can be provided to the user device for display to the user. A user can then select a transformation program to obtain transformed output results, or a preview thereof. As can be appreciated, the transformation program suggestions may be provided for particular transformation programs, such as a set of highest ranked transformation programs. The specific set of highest ranked transformation programs can be determined in any manner. As one example, a ranking exceeding threshold may be designated as a high ranked transformation program and, as such, used to provide a transformation program suggestion.

As another example, a transformation program can be automatically initiated (e.g. without a user selection of a transformation program). For instance, a highest ranking transformation program might be executed with transformed output results being provided to the user device for display to the user. As can be appreciated, transformation programs might be executed at a user device or at a transformation engine (or otherwise remote from the user device). For instance, after a transformation program is selected by a user, in some implementations, the user device can execute the transformation program. In other implementations, an indication of the selected transformation program can be provided to the transformation engine to execute the transformation program with transformed output being returned to the user device for display to the user.

Exemplary Data Transformation Implementations

As described, various implementations can be used in accordance with embodiments of the present invention. FIGS. 3 and 7-9 illustrate exemplary user interfaces for implementing data transformations. FIG. 3 illustrates an example user interface 300 associated with a data transformation. Column A 310 represents various formats of dates on which particular transactions occurred. To perform a data transformation in accordance with embodiments of the present invention, assume a user creates a new column B 312 adjacent to the various date formats. Further assume that the user enters or inputs two sample outputs in a desired format, example output value 314 and example output value 316. Upon selecting the dates provided in column 310, the example output values 314 and 316, and the "go" button 318, various transformation programs can be generated using the example input values of column A 310 and example output values 314 and 316. In some embodiments, the example input and/or output values used for generating transformation programs might be automatically identified or selected. For instance, a user may select the "go" button 318, and based on initiation of a data transformation, example input and output values might be selected for providing to a transformation engine. As shown, two composed transformation programs are provided as suggestions 320 and 322. Such transformation program suggestions 320 and 322 can be represented in any manner, such as via an indication of the underlying transformation tool used to generate the transformation program.

Now assume the user hovers over a particular transformation program suggestion, such as transformation program suggestion 320. In such a case, a preview of transformed output values 324 can be provided corresponding with the remaining example input values (or any or all values associated with example input values, such as values provided in the same column). An indication may be provided to implement the transformed output values 324 (e.g., selection of the transformation program suggestion as opposed to hovering over the suggestion, etc.). As can be appreciated, determination of the transformed output values can be made using the selected transformation program via a user device, or a remote device (e.g., a transformation engine running remote from the user device). Further, in some cases, the source code of the composed transformation program is available, or can be provided, to a user such that the user can review and/or modify the source code. For example, a user may select a transformation program suggestion, such as transformation program 326, to view and/or modify the source code.

Figure 7:
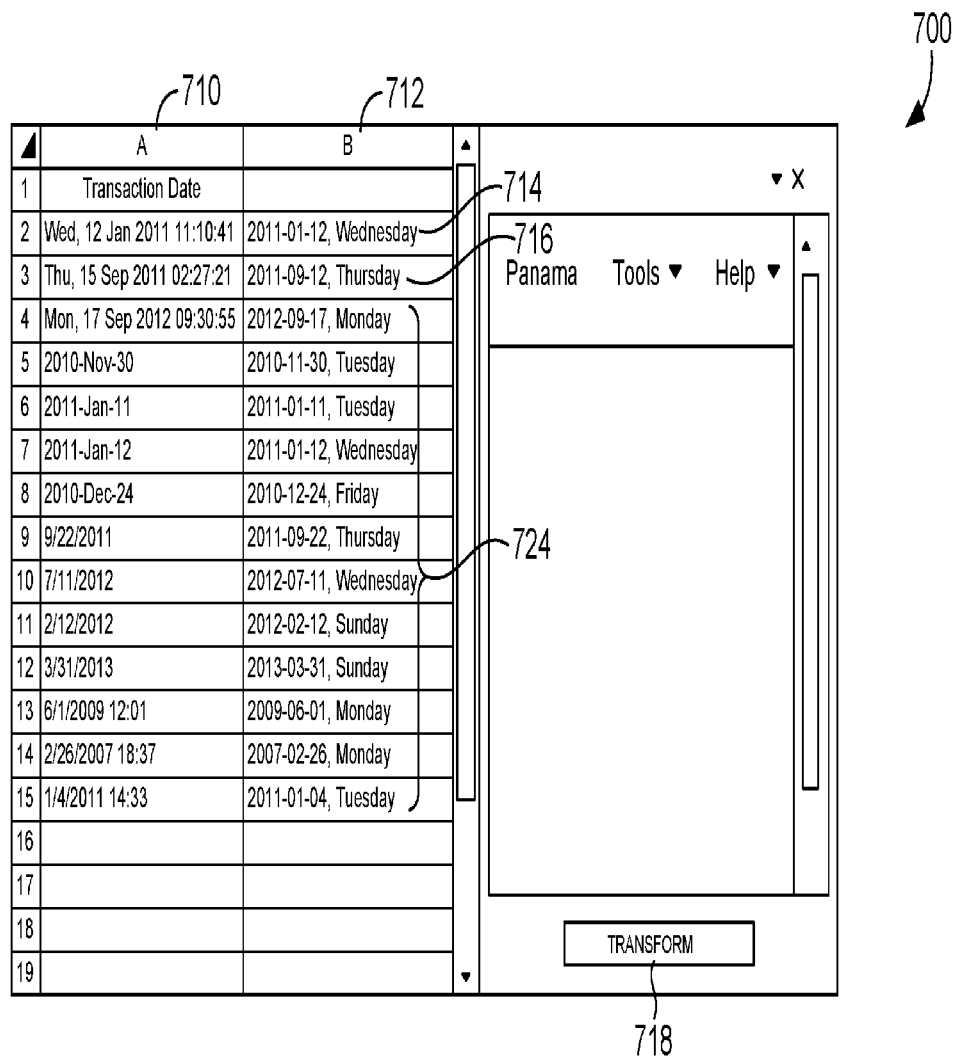
FIG. 7 provides another exemplary graphical user interface associated with a data transformation, in accordance with aspects of the technology described herein.

Turning now to FIG. 7, FIG. 7 illustrates another example user interface 700 associated with a data transformation. Column A 710 represents various formats of dates on which particular transactions occurred. To perform a data transformation in accordance with embodiments of the present invention, assume a user creates a new column B 712 adjacent to the various date formats. Further assume that the user enters or inputs two sample outputs in a desired format, example output value 714 and example output value 716. Upon selecting the dates provided in column 710, the example output values 714 and 716, and the "transform" button 718, transformed output values 724 can be generated and presented. For example, various transformation programs can be generated using the example input values of column A 710 and example output values 714 and 716. As previously described, in some embodiments, the example input and/or output values used for generating transformation programs might be automatically identified or selected. From the transformation programs generated, a highest ranked transformation program can be automatically selected and used to perform a data transformation resulting in the transformed output values 724. Such a transformation program may be executed at the user device or remote from the user device.

With reference to FIGS. 8A-8B, FIG. 8A-8B illustrate another example user interface 800 associated with a data transformation. Column A 810 represents various formats of dates on which particular transactions occurred. To perform a data transformation in accordance with embodiments of the present invention, the various formats, or inconsistent formats, of dates might be automatically detected. Based on the detection of heterogeneous formats in the column, the dates provided in column A 810 can be automatically provided to a transformation engine as example input values. In some cases, one or more of the dates can also be designated as an example output value(s). For instance, a first date might be designated as an example output value. As another example, a most frequently used date format might be identified and used as an example output value. As yet another example, a user might be prompted to designate a desired example output value (e.g., from the input values). Based on the example input and output values, various transformation programs can be generated and presented as transformation program suggestions 820 and 824. A user then has an option to select one of the transformation program suggestions to obtain a set of transformed data. For example, assume that a user selects transformation program suggestion 820, as illustrated in FIG. 8B, a new column B 812 may be added to include transformed values that have a homogenous format.

With reference to FIGS. 9A-9B, FIGS. 9A-9B illustrate another example user interface 900 associated with a data transformation. Column A 910 represents various formats of dates on which particular transactions occurred. To perform a data transformation in accordance with embodiments of the present invention, the various formats, or inconsistent formats, of dates might be automatically detected. Based on the detection of heterogeneous formats in the column, the dates provided in column A 910 can be automatically provided to a transformation engine as example input values. In some cases, one or more of the dates can also be designated as an example output value(s). For instance, a first date might be designated as an example output value. As another example, a most frequently used date format might be identified and used as an example output value. Based on the example input and output values, various transformation programs can be generated. A highest ranked transformation program can be automatically selected and used to perform a data transformation resulting in the transformed output values 924. As illustrated in FIG. 9B, a column B 912 with the transformed output values 924 can be automatically generated and provided. Execution of a transformation program may occur at the user device or remote from the user device. As another example, transformed output values can be suggested within the original input column. For instance, values identified to be transformed can be highlighted or otherwise recognized as a possible value to transform to another format for consistency of data.

Figure 10:
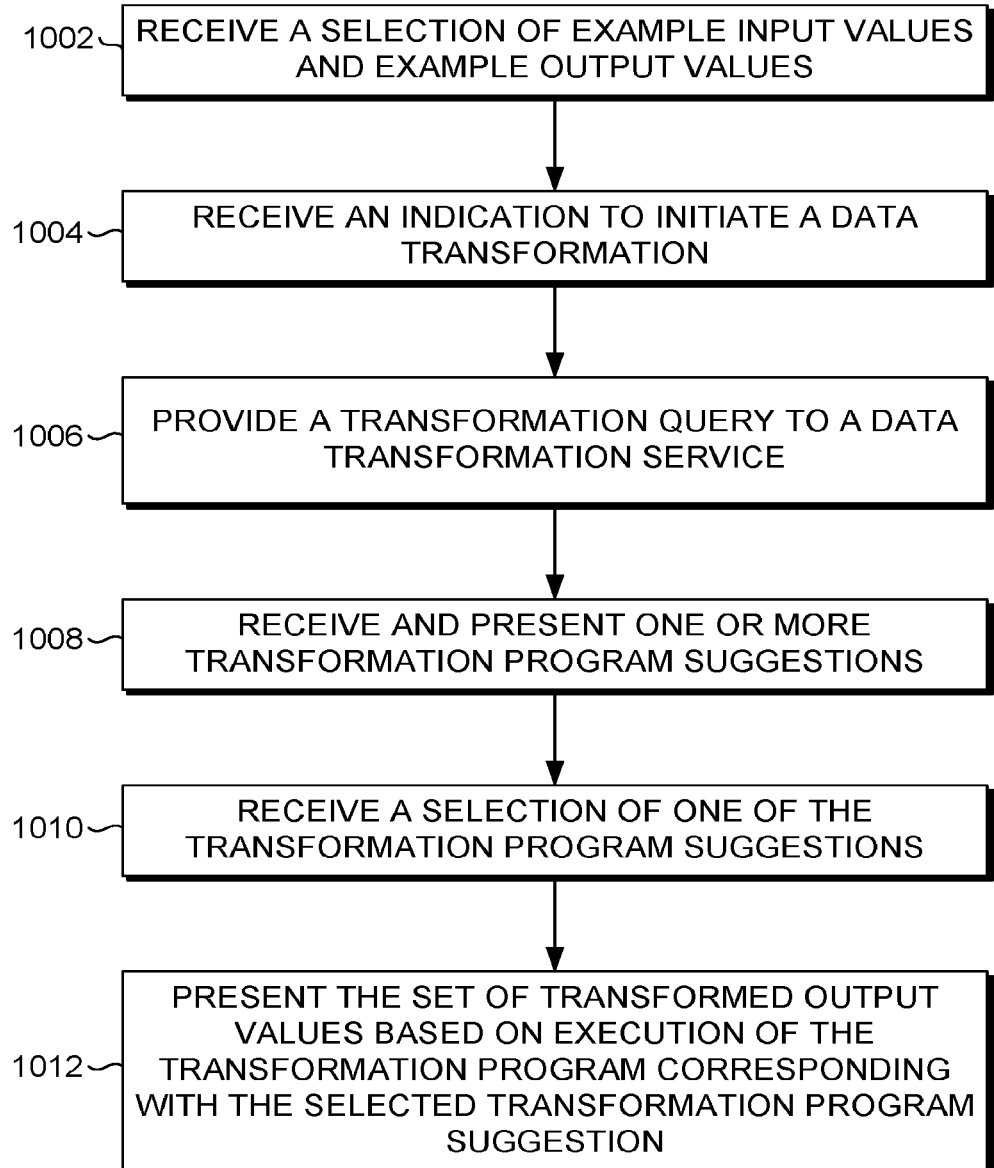
FIG. 10 is a flow diagram that illustrates an exemplary method implementing data transformations at a user device, in accordance with aspects of the technology described herein.
Figure 11:
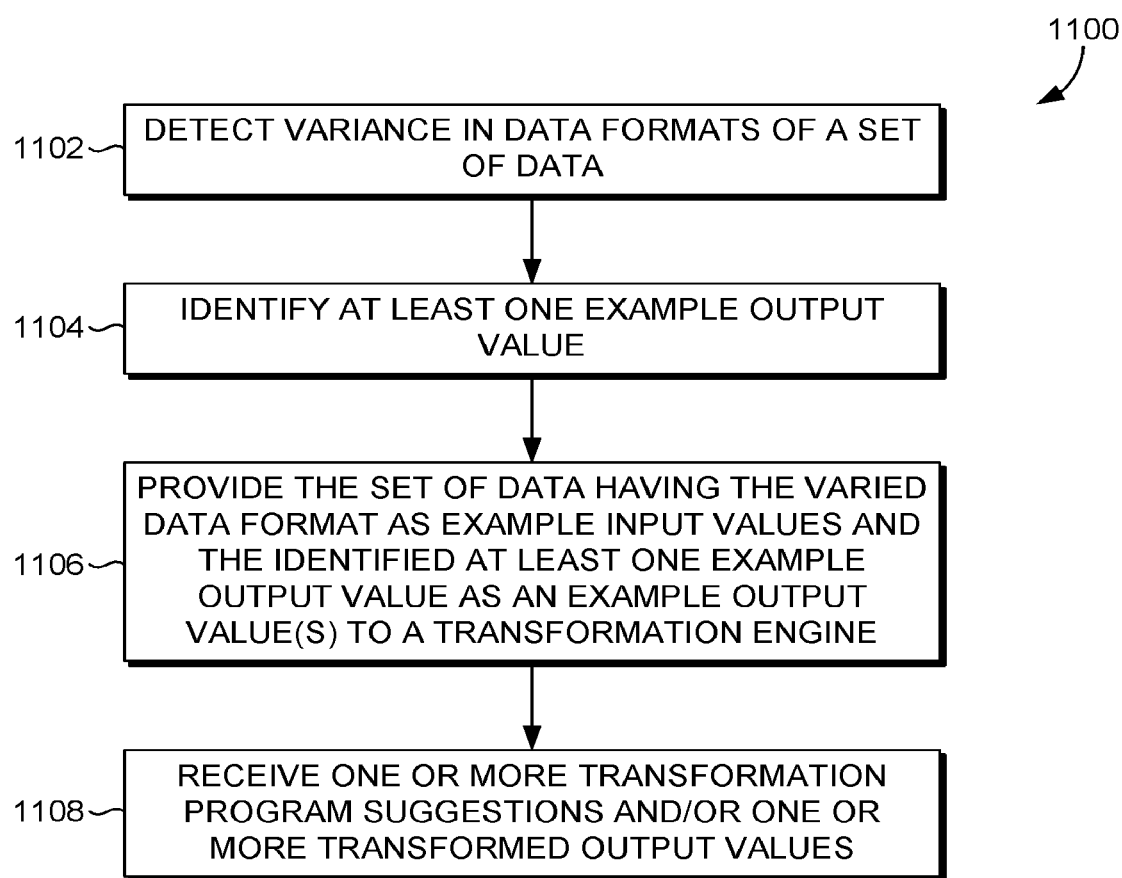
FIG. 11 is a flow diagram that illustrates another exemplary method implementing data transformations at a user device, in accordance with an aspect of the technology described herein.

FIGS. 10 and 11 provide methods of implementing data transformations at a user device. The methods 1000 and 1100 can be performed by a computer device, such as device 100 described previously. The flow diagrams represented in FIGS. 10-11 are intended to be exemplary in nature and not limiting.

Turning initially to method 1000 of FIG. 10, at block 1002, a selection of example input values and example output values is received. At block 1004, an indication to initiate a data transformation is received. Thereafter, at block 1006, a transformation query, including the selection of example input and output values, is provided to a data transformation service. In response, at block 1008, one or more transformation program suggestions are received and presented to a user. Such transformation program suggestions can be generated by the data transformation service using the example input and/or output values. At block 1010, a selection of one of the transformation program suggestions is received. Based on the selection of a transformation program suggestion, the corresponding transformation program can be executed and provide a set of transformed output values. At block 1012, the set of transformed output values are presented based on execution of the transformation program corresponding with the selected transformation program suggestion.

Turning to method 1100 of FIG. 11, at block 1102, variance in data formats of a set of data is detected. At block 1104, at least one example output value is identified. In some cases, an example output value may be identified based on a position among the set of data (e.g., a first entered value), a most frequently occurring data format, a user selection, or the like. At block 1106, the set of data having the varied data format is provided as example input values and the identified at least one example output value is provided as an example output value(s), for example, to a transformation engine. In some cases, such data might be provided based on a user selection to perform a data transformation. For example, upon detecting a variance in data formats, a user may be prompted to select whether to perform a data transformation to result in a consistent data format. At block 1108, one or more transformation program suggestions and/or one or more transformed output values are received. For instance, in some cases, a set of potential transformation program suggestions might be provided to the user device such that the user can select to preview or execute a particular transformation program. In other cases, a set of transformed output values that correspond with the set of data having the varied data formats might be received. In such a case, a transformation program may be generated and automatically used to return the one or more transformed output values.

Figure 12:
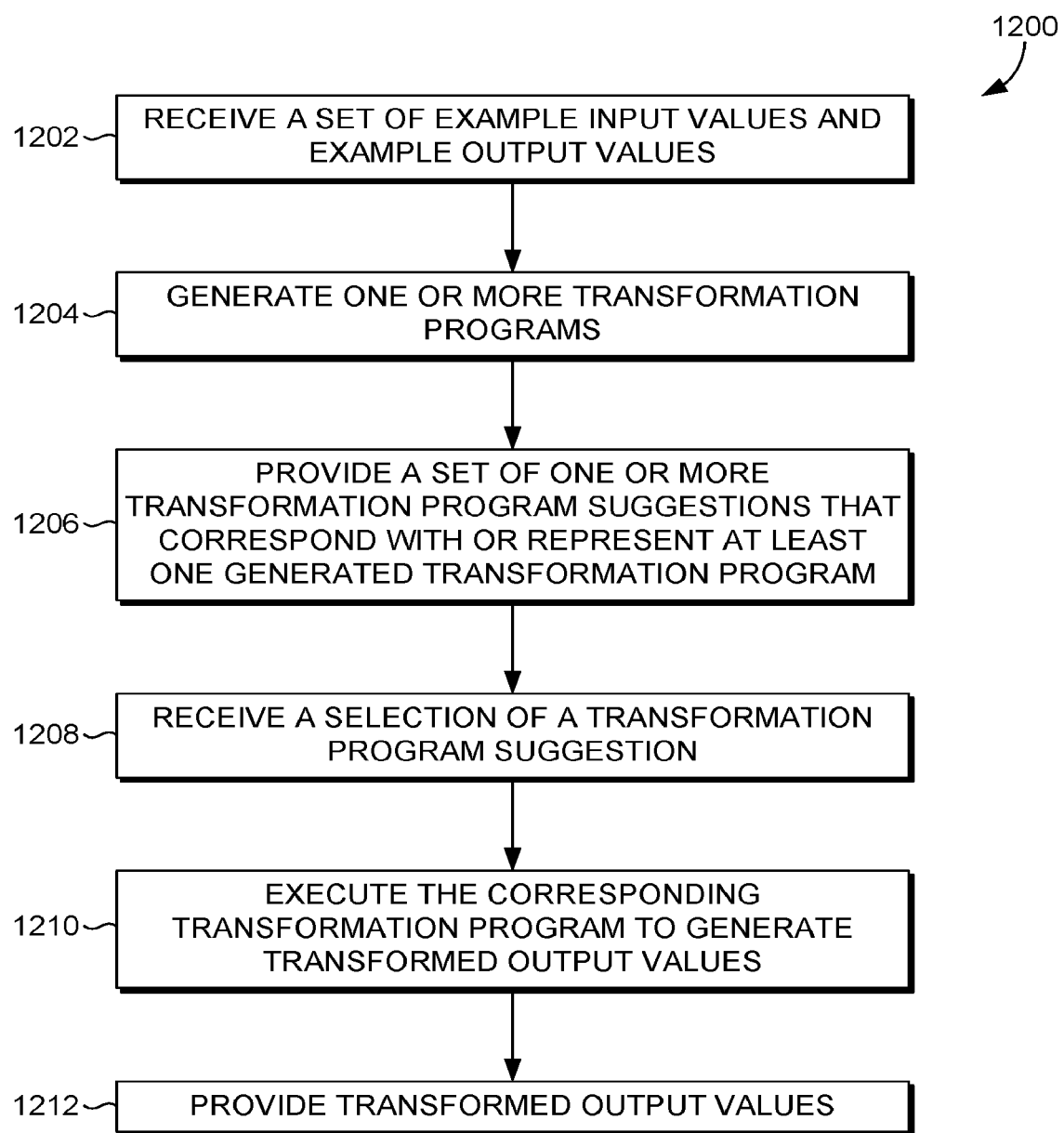
FIG. 12 is a flow diagram that illustrates an exemplary method of implementing data transformations, in accordance with an aspect of the technology described herein.
Figure 13:
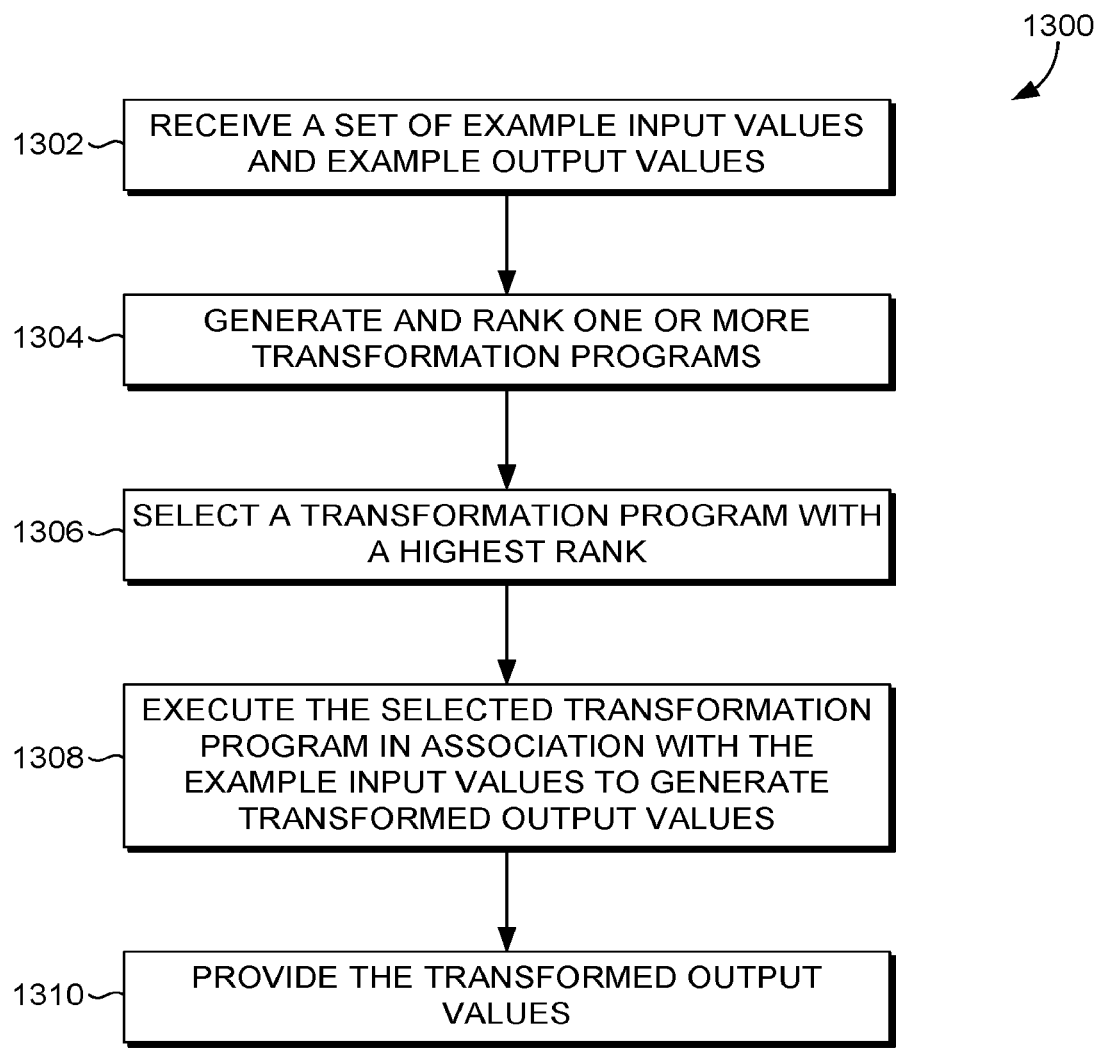
FIG. 13 is a flow diagram that illustrates another exemplary method of implementing data transformations, in accordance with an aspect of the technology described herein.

FIGS. 12 and 13 provide methods of implementing data transformations, for example, at a transformation engine. The methods 1200 and 1300 can be performed by a computer device, such as device 100 described previously. The flow diagrams represented in FIGS. 12-13 are intended to be exemplary in nature and not limiting.

Turning initially to method 1200 of FIG. 12, at block 1202, a set of example input values and example output values is received, for example, from a user device. At block 1204, one or more transformation programs are generated. As described herein, transformation programs can be generated in any number of ways. Generally, transformation programs are generated at least using a preexisting transformation tool identified as relevant to the desired data transformation, as indicated in the example input and output values. At block 1206, a set of one or more transformation program suggestions are provided that correspond with or represent at least one generated transformation program. Thereafter, at block 1208, a selection of a transformation program suggestion is received. For example, a user presented with transformation program suggestions may select one of the suggestions to initiate execution of the corresponding transformation program. Based on the selected transformation program suggestion, at block 1210, the corresponding transformation program can be executed to generate transformed output values. Such transformed output values are provided, as indicated at block 1212. For instance, the transformed output values can be provided to a user device requesting a data transformation. As can be appreciated, in some embodiments, a user device might execute a transformation program. In such a case, the transformed output values are generated and provided at the user device. Further, in such an embodiment, the program code for the transformation program can be provided to the user device so that the user device can execute the program.

Turning to method 1300 of FIG. 13, initially, at block 1302, a set of example input values and example output values is received, for example, from a user device. At block 1304, one or more transformation programs are generated and ranked. As described herein, transformation programs can be generated in any number of ways. Generally, transformation programs are generated at least using a preexisting transformation tool identified as relevant to the desired data transformation, as indicated in the example input and output values. At block 1306, a transformation program with a highest rank is selected. Subsequently, at block 1308, the selected transformation program is executed in association with the example input values to generate transformed output values. At block 1310, the transformed output values are provided, for instance to a user device providing the example input values. As can be appreciated, in some embodiments, a user device might execute a transformation program. In such a case, the program code for the transformation program can be provided to the user device for subsequent execution of the transformation program.

Exemplary Transformation Tool Collection Implementations

Figure 14:
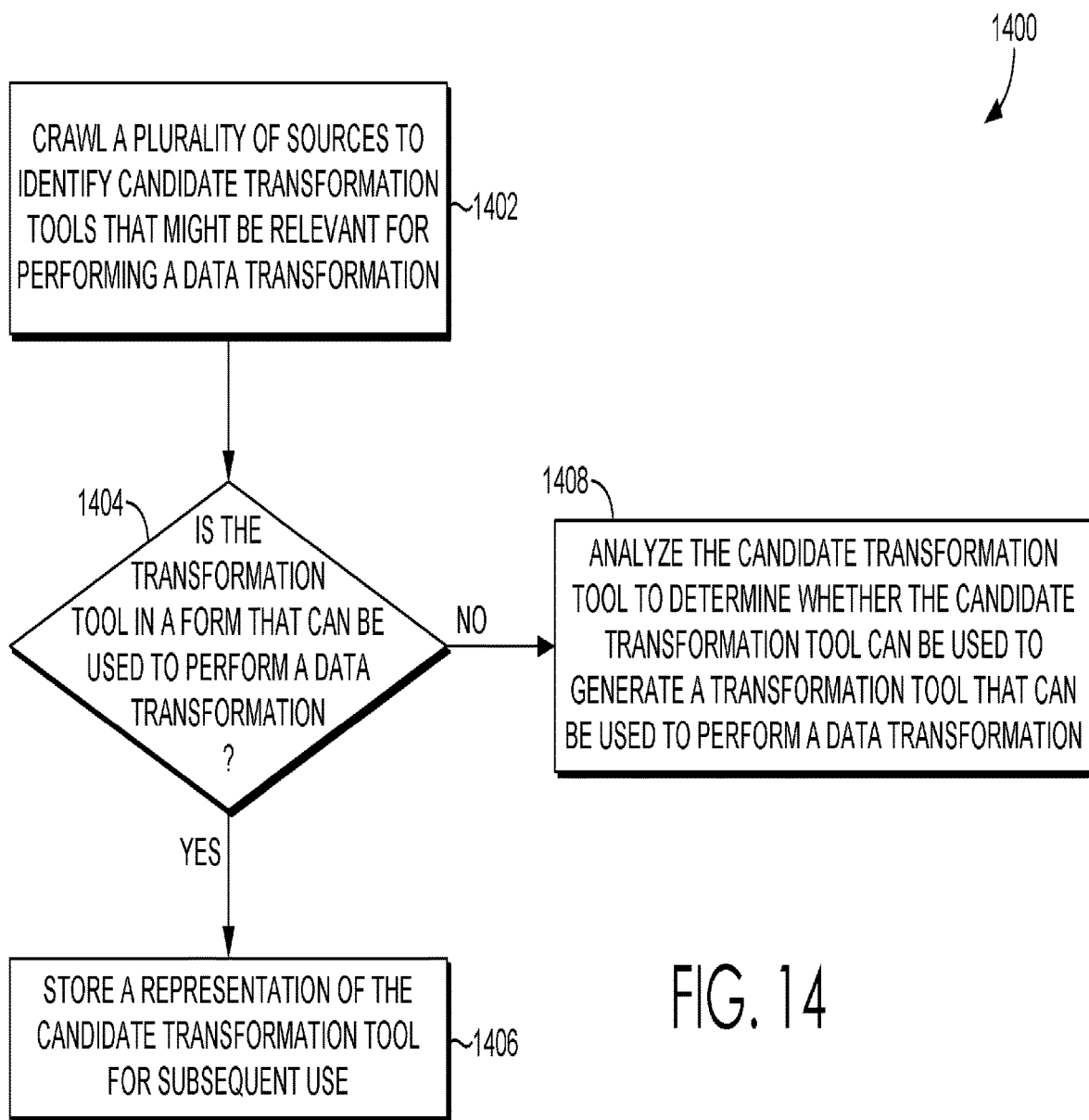
FIG. 14 is a flow diagram that illustrates an exemplary method for collecting transformation tools, in accordance with an aspect of the technology described herein.
Figure 15:
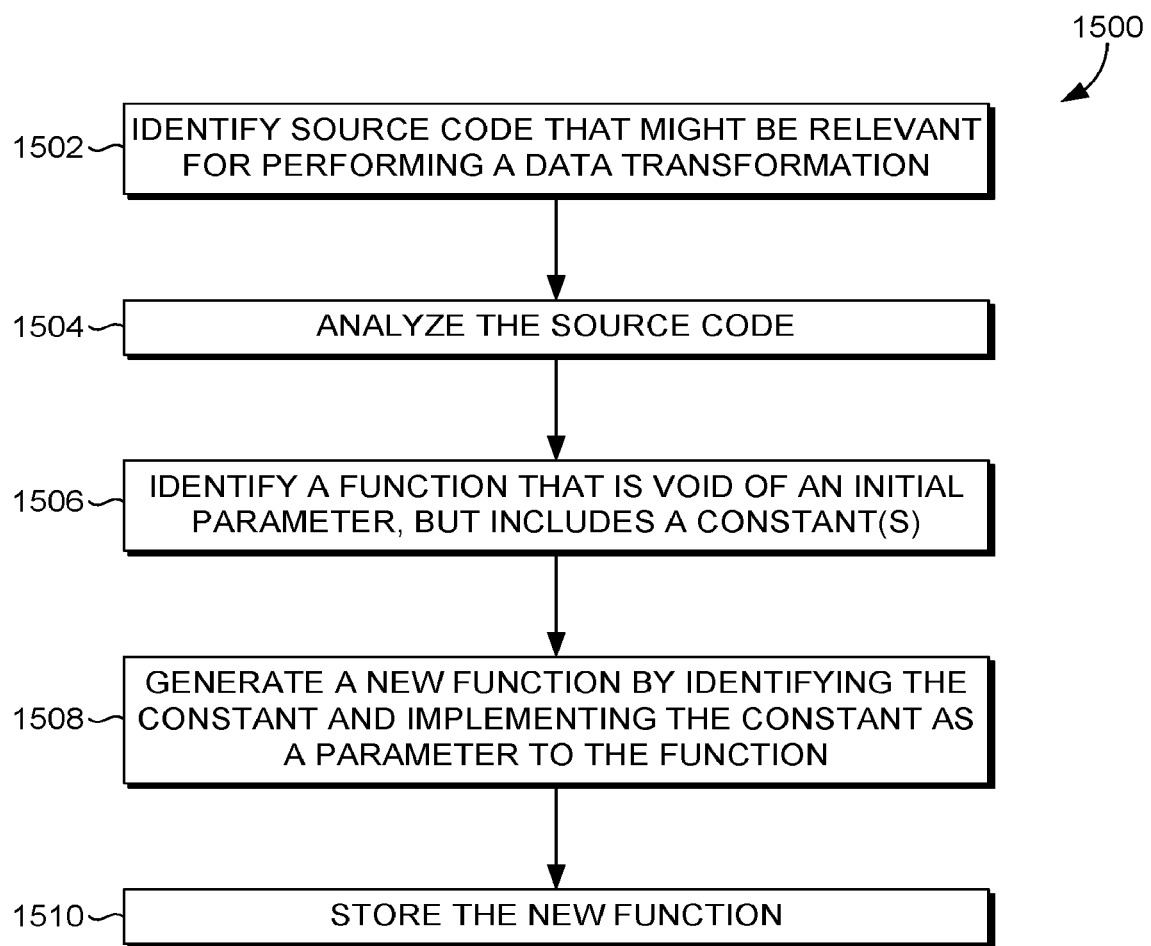
FIG. 15 is a flow diagram that illustrates an exemplary method for generating transformation tools, in accordance with an aspect of the technology described herein.
Figure 16:
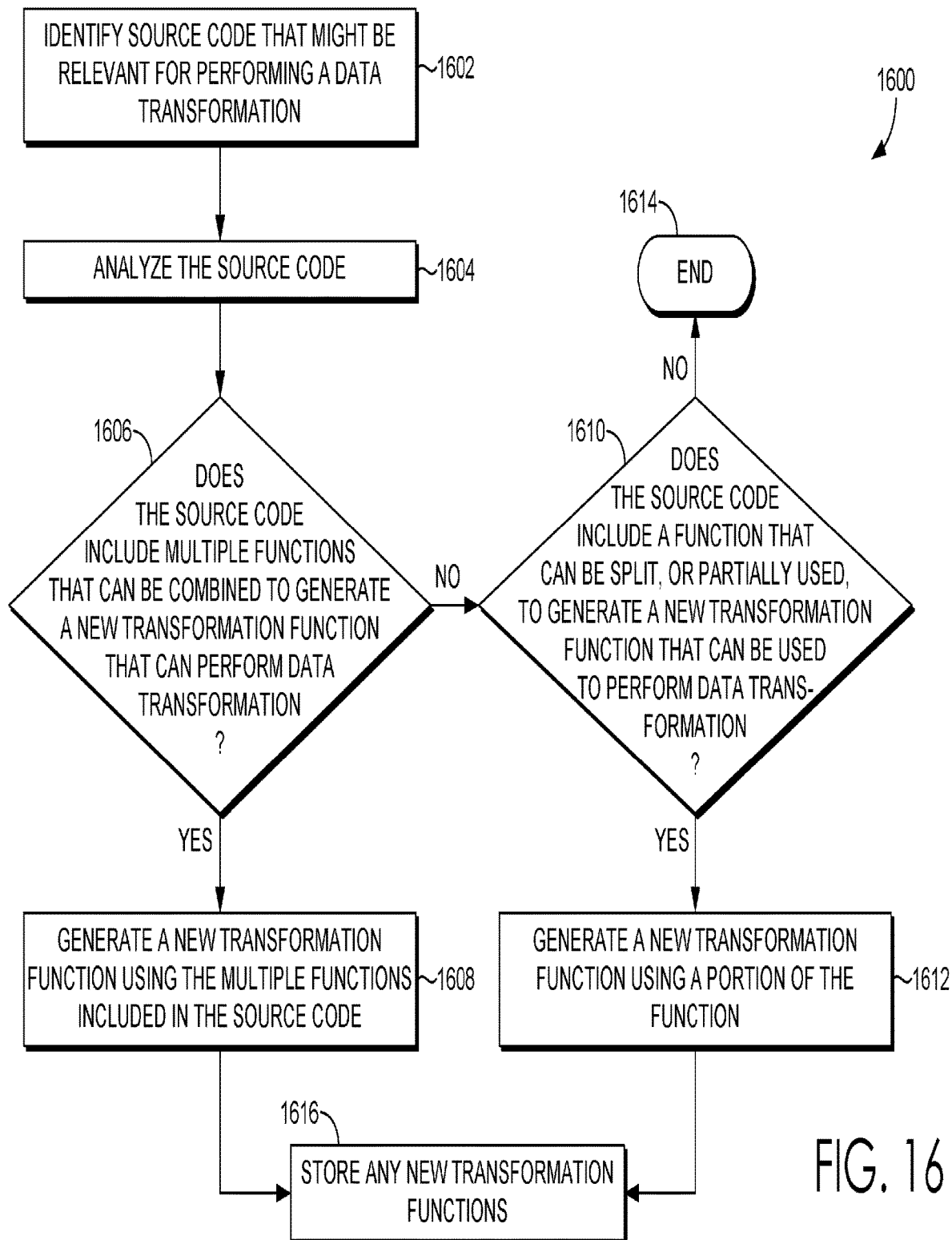
FIG. 16 is a flow diagram that illustrates another exemplary method for generating transformation tools, in accordance with an aspect of the technology described herein.

As described, various transformation tool collecting implementations can be used in accordance with embodiments of the present invention. FIGS. 14-16 provide exemplary methods of implementing transformation tool collection or acquisition, in accordance with various embodiments of the present invention. The methods 1400, 1500, and 1600 can be performed by a computer device, such as device 100 described previously. The flow diagrams represented in FIGS. 14-16 are intended to be exemplary in nature and not limiting.

Turning initially to FIG. 14, FIG. 14 provides a method 1400 for collecting transformation tools. At block 1402, a plurality of sources (e.g., web sources) are crawled to identify candidate transformation tools that might be relevant for performing a data transformation. At block 1404, each candidate transformation tool is analyzed to determine whether the transformation tool is in a form that can be used to perform a data transformation. If so, at block 1406, a representation of the candidate transformation tool is stored for subsequent use. A representation of the candidate transformation tool might be the transformation tool, a source, or portion thereof, associated with the transformation tool, a reference to the transformation tool, or the like. If, however, a candidate transformation tool is not in a form that can be used to perform a data transformation, the candidate transformation tool is analyzed to determine whether the candidate transformation tool can be used to generate a transformation tool that can be used to perform a data transformation. This is indicated at block 1408. For example, source code can be analyzed to determine how to generate compilable code from code otherwise deemed non-compilable.

Turning now to FIG. 15, FIG. 15 provides a method 1500 for generating transformation tools. Initially, at block 1502, source code that might be relevant for performing a data transformation is identified. At block 1504, the source code is analyzed. In accordance with the analysis of the source code, at block 1506, a function is identified that is void of an initial parameter, but includes a constant(s). Thereafter, at block 1508, a new function is generated by identifying the constant and implementing the constant as a parameter to the function. At block 1510, the new function is stored.

FIG. 16 provides another example method 1600 for generating transformation tools. Initially, at block 1602, source code that might be relevant for performing a data transformation is identified. At block 1604, the source code is analyzed. In accordance with analyzing the source code, at block 1606, it is determined whether the source code includes multiple functions that can be combined to generate a new transformation function that can perform data transformation. If so, a new transformation function is generated using the multiple functions included in the source code, as indicated at block 1608. If not, it is determined whether the source code includes a function that can be split, or partially used, to generate a new transformation function that can be used to perform data transformation. This is indicated at block 1610. If so, a new transformation function is generated using a portion of the function, as indicated at block 1612. If not, the method ends at block 1614. At block 1616, any new transformation functions are stored.

Exemplary Transformation Tool Annotation Implementations

Figure 17:
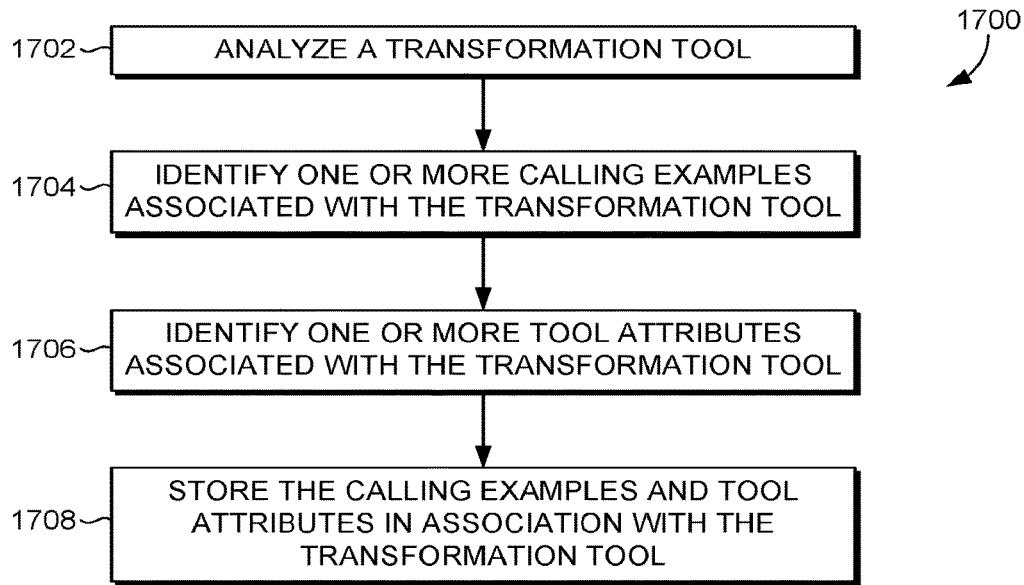
FIG. 17 is a flow diagram that illustrates an exemplary method for annotating transformation tools, in accordance with an aspect of the technology described herein.
Figure 18:
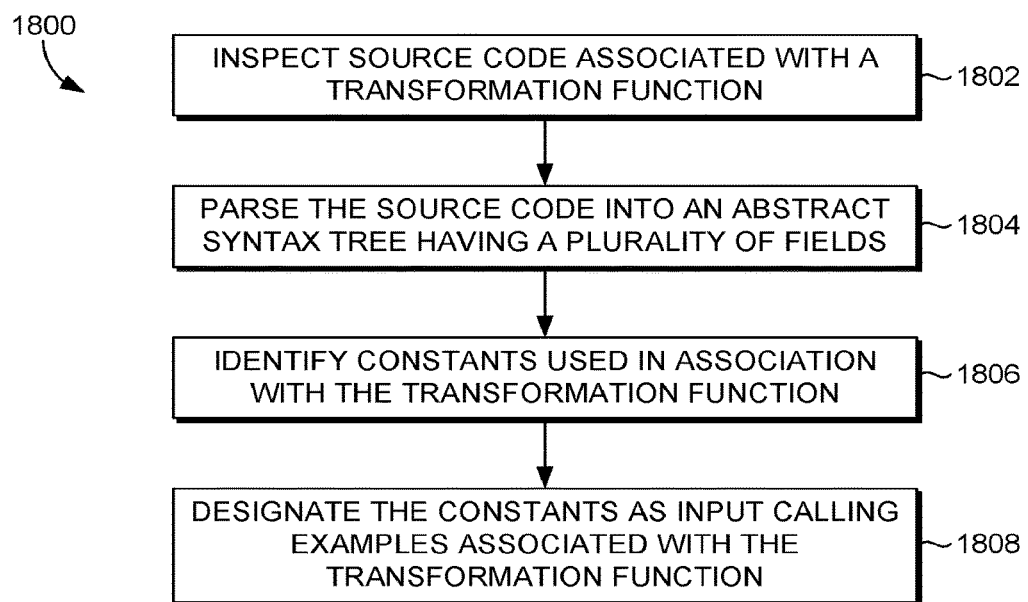
FIG. 18 is a flow diagram that illustrates an exemplary method for annotating transformation tools via static analysis, in accordance with an aspect of the technology described herein.
Figure 19:
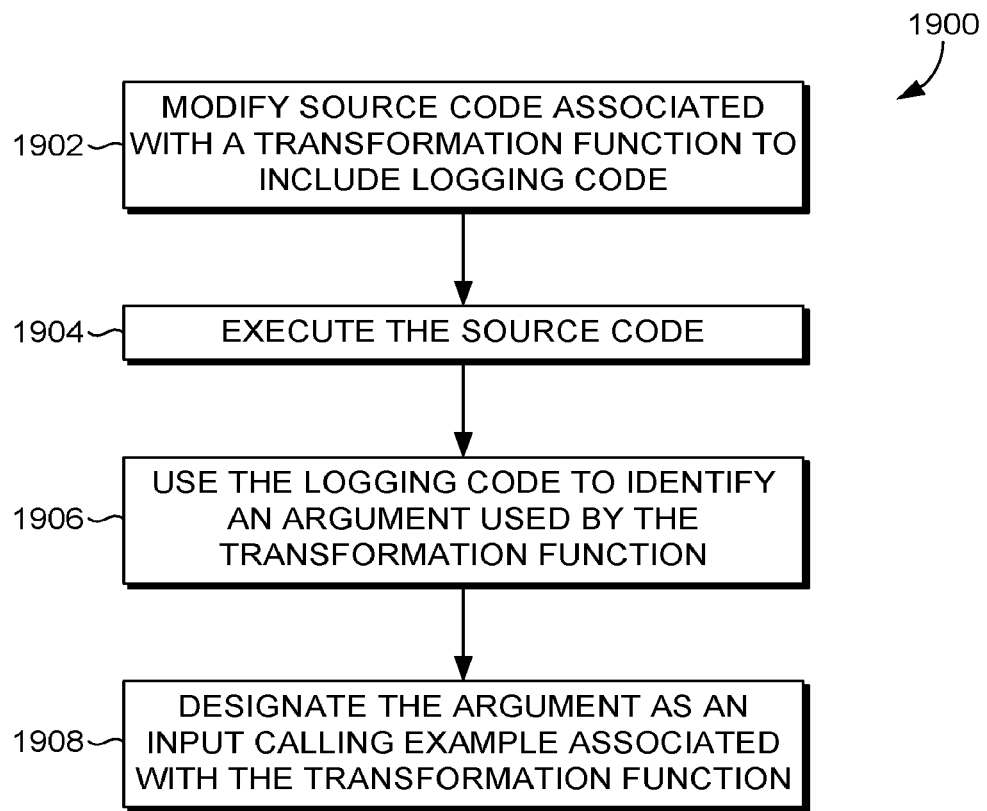
FIG. 19 is a flow diagram that illustrates an exemplary method for annotating transformation tools via dynamic analysis, in accordance with an aspect of the technology described herein.

As described, various transformation tool annotating implementations can be used in accordance with embodiments of the present invention. FIGS. 17-19 provide exemplary methods of implementing transformation tool annotation, in accordance with various embodiments of the present invention. The methods 1700, 1800, and 1900 can be performed by a computer device, such as device 100 described previously. The flow diagrams represented in FIGS. 17-19 are intended to be exemplary in nature and not limiting.

Turning initially to FIG. 17, FIG. 17 provides a method 1700 for annotating transformation tools. Initially, at block 1702, a transformation tool is analyzed. The transformation tool can be analyzed in any manner, such as, for instance, via static analysis and/or dynamic analysis. At block 1704, one or more calling examples associated with the transformation tool are identified. Such calling examples may include calling input examples and/or calling output examples. At block 1706, one or more tool attributes associated with the transformation tool are identified. Tool attributes may describe or characterize the transformation tool, or source corresponding with the transformation tool. Such tool attributes might include, for example, tool popularity, tool usage, tool author, tool complexity, tool relationships, tool patterns, or the like. At block 1708, the calling examples and tool attributes are stored in association with the transformation tool.

With reference to FIG. 18, FIG. 18 provides a method 1800 for annotating transformation tools via static analysis, in accordance with embodiments of the present invention. Initially, at block 1802, source code associated with a transformation function is inspected. At block 1804, the source code is parsed into an abstract syntax tree having a plurality of fields. At block 1806, constants used in association with the transformation function are identified. Thereafter, at block 1808, the constants are designated as input calling examples associated with the transformation function.

FIG. 19 provides a method 1900 for annotating transformation tools via dynamic analysis, in accordance with embodiments of the present invention. Initially, at block 1902, source code associated with a transformation function is modified to include logging code. Such logging code can be used to log arguments passed into a transformation function. At block 1904, the source code is executed. Thereafter, at block 1906, the logging code is used to identify an argument used by the transformation function. At block 1908, the argument is designated as an input calling example associated with the transformation function.

Exemplary Data Indexing Implementations

Figure 20:
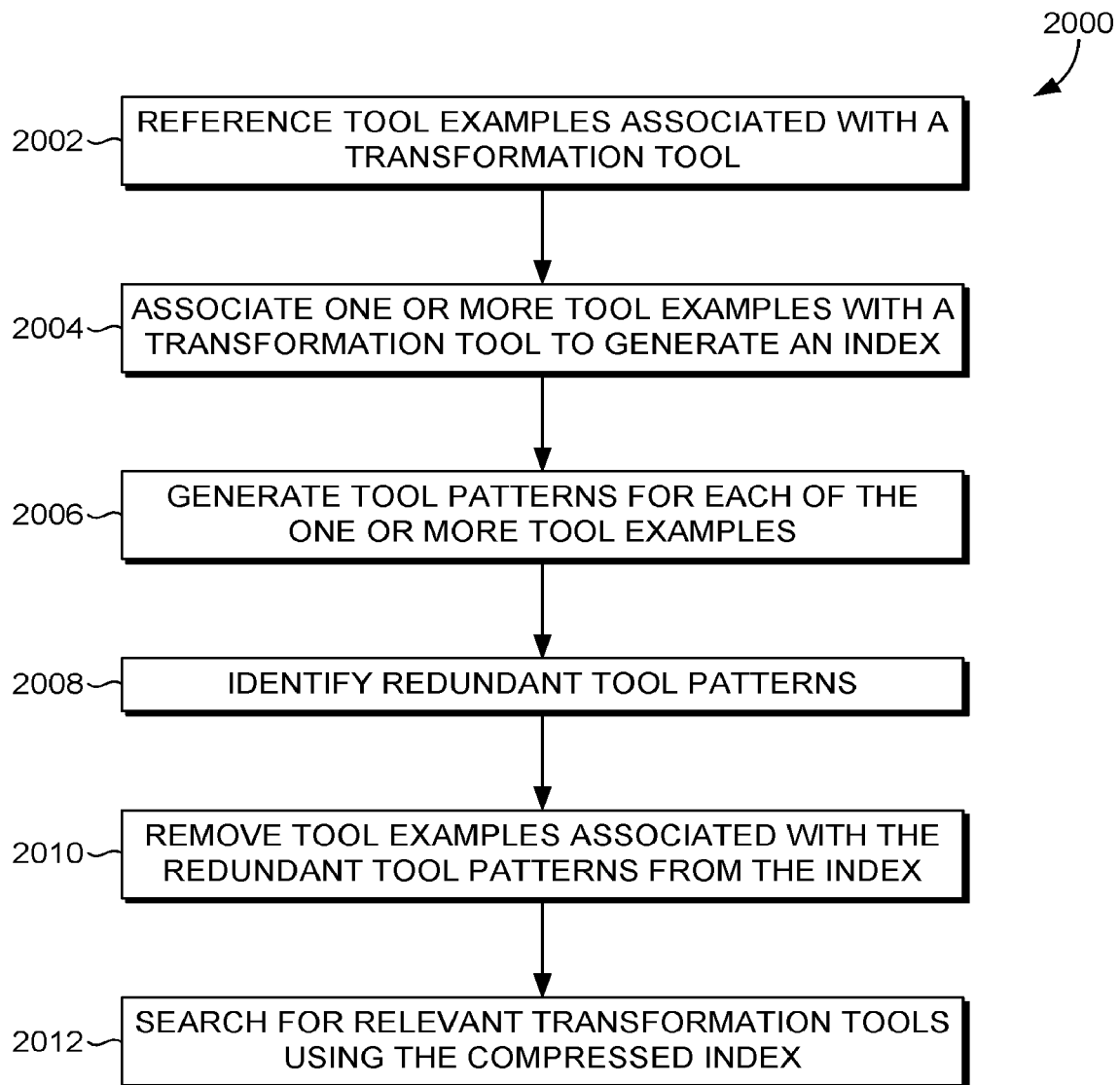
FIG. 20 is a flow diagram that illustrates an exemplary method for generating an index, in accordance with an aspect of the technology described herein.
Figure 21:
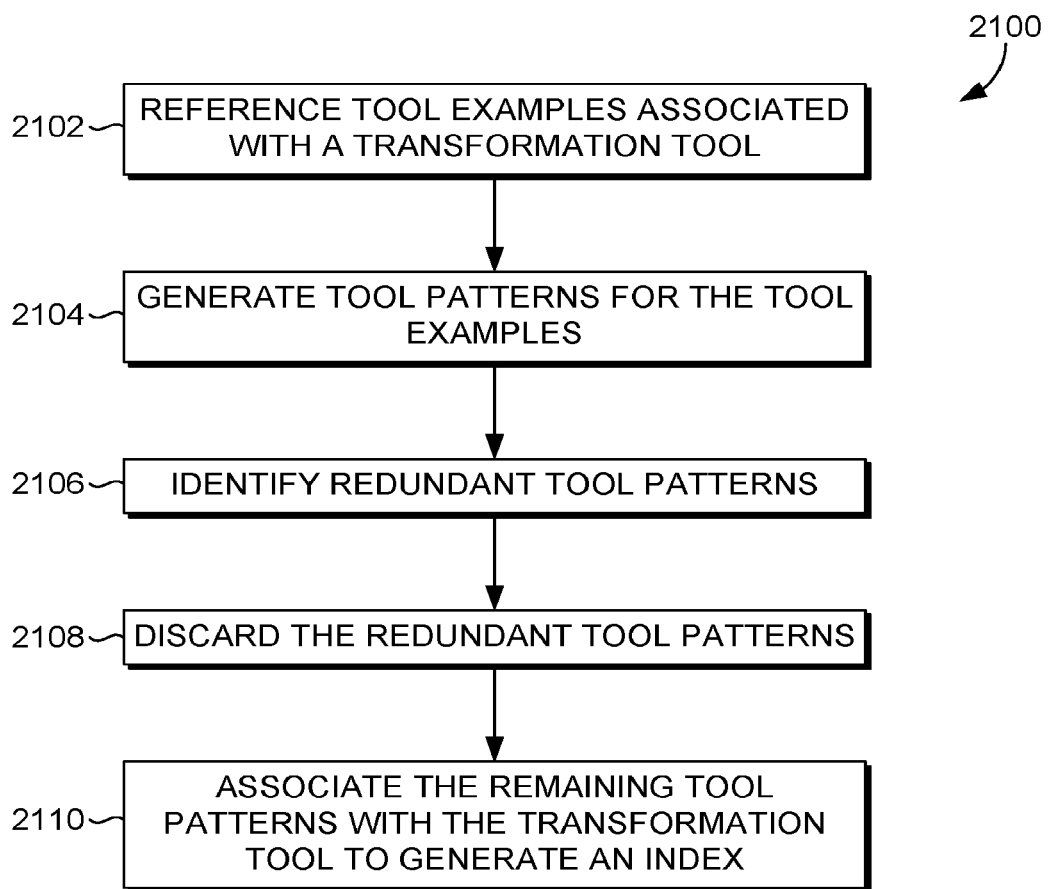
FIG. 21 is a flow diagram that illustrates another exemplary method for generating an index, in accordance with an aspect of the technology described herein.

As described, various data indexing implementations can be used in accordance with embodiments of the present invention. FIGS. 20-21 provide exemplary methods of implementing data indexing, in accordance with various embodiments of the present invention. The methods 2000 and 2100 can be performed by a computer device, such as device 100 described previously. The flow diagrams represented in FIGS. 20 and 21 are intended to be exemplary in nature and not limiting.

Turning initially to FIG. 20, FIG. 20 provides a method 2000 for generating an index, in accordance with embodiments of the present invention. Initially, at block 2002, tool examples associated with a transformation tool are referenced. At block 2004, one or more tool examples are associated with a transformation tool to generate an index. Tool examples may include calling input examples and/or calling output examples. At block 2006, tool patterns are generated for each of the one or more tool examples. At block 2008, redundant tool patterns can be identified. Thereafter, at block 2010, tool examples associated with the redundant tool patterns can be removed from the index. At block 2012, the compressed index is used to search for relevant transformation tools. As can be appreciated, in some embodiments, an index may include numerous transformation tools and corresponding tool examples. Further, in another implementation, tool patterns can be generated and used to remove redundancy prior to generating the index.

With reference to FIG. 21, FIG. 21 provides a method 2100 for generating an index, in accordance with embodiments of the present invention. Initially, at block 2102, tool examples associated with a transformation tool are referenced. At block 2104, tool patterns are generated for the tool examples. At block 2106, redundant tool patterns are identified. Tool patterns may be considered redundant if the same or similar within a threshold of similarity. At block 2108, the redundant tool patterns can be discarded. Thereafter, at block 2110, the remaining tool patterns are associated with the transformation tool to generate an index. As can be appreciated, in some embodiments, an index may include numerous transformation tools and corresponding tool patterns. Further, in another implementation, tool patterns can be generated and used to remove redundancy after generating the index.

Exemplary Transformation Program Generation Implementations

As described, various transformation program generating implementations can be used in accordance with embodiments of the present invention. FIGS. 22-25 provide exemplary methods of implementing transformation program generation, in accordance with various embodiments of the present invention. The methods 2200, 2300, 2400, and 2500 can be performed by a computer device, such as device 100 described previously. The flow diagrams represented in FIGS. 22-25 are intended to be exemplary in nature and not limiting.

Figure 22:
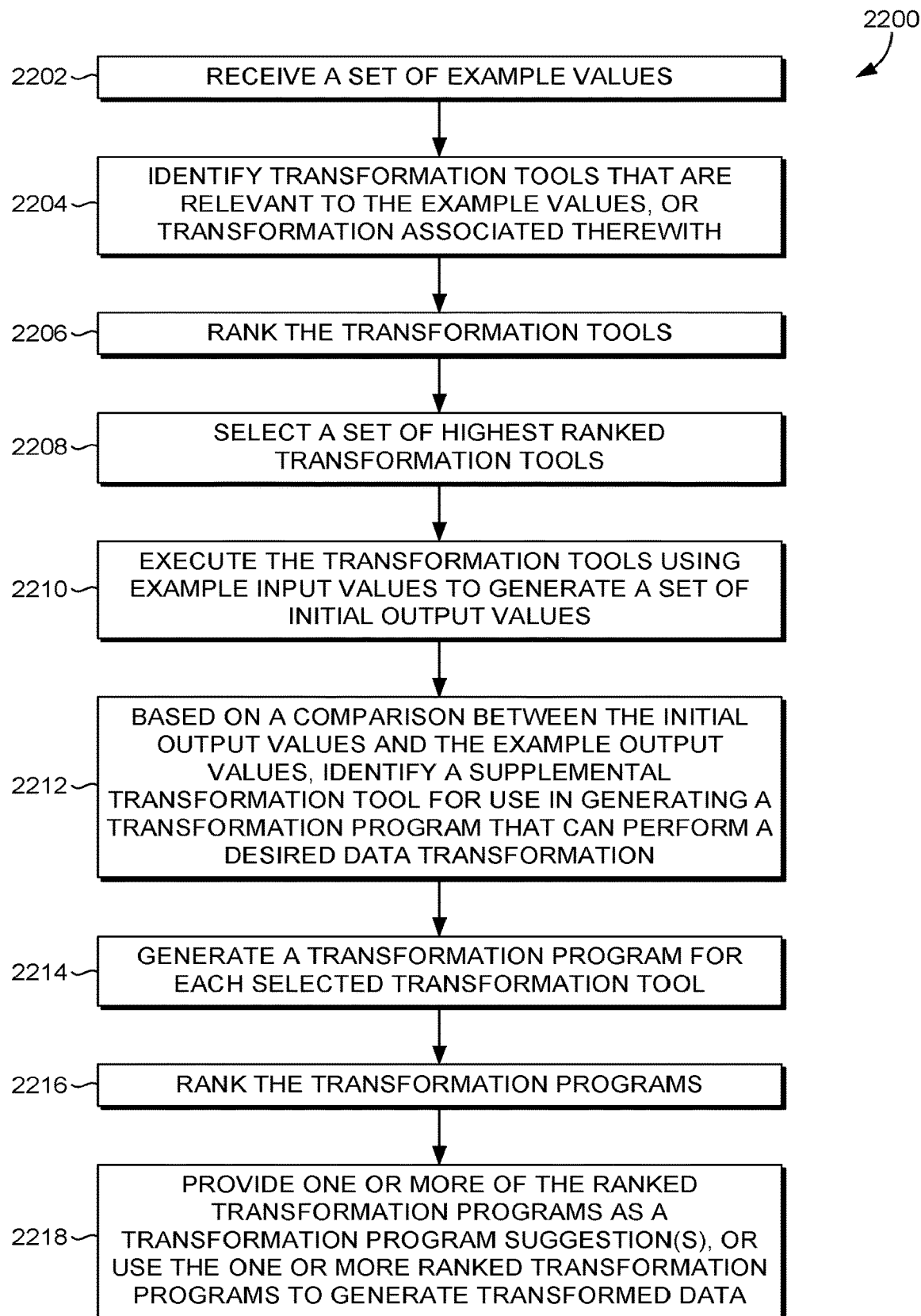
FIG. 22 is a flow diagram that illustrates an exemplary method for generating and providing transformation programs, in accordance with an aspect of the technology described herein.

Turning initially to FIG. 22, FIG. 22 provides a method 2200 for generating and providing transformation programs, in accordance with embodiments of the present invention. Initially, at block 2202, a set of example values are received.

In embodiments, example values, such as example input values and example output values, can be received from a user device, for example, based on a user indication. At block 2204, transformation tools that are relevant to the example values, or transformation associated therewith, are identified. Any number of manners can be used to identify relevant transformation tools. For instance, a comparison of example values to tool examples (e.g., calling examples) can be used. As another example, a comparison of example value patterns to tool patterns can be used. At block 2206, the transformation tools are ranked. For instance, transformation tools can be ranked based on syntactic distance associated with the comparison of example values and tool values, or patterns associated therewith. At block 2208, a set of highest ranked transformation tools are selected. For each of the selected transformation tools, the transformation tools are executed using example input values to generate a set of initial output values. This is indicated at block 2210. Based on a comparison between the initial output values and the example output values, a supplemental transformation tool is identified or determined for use in generating a transformation program that can perform a desired data transformation. This is indicated at block 2212. At block 2214, a transformation program is generated for each selected transformation tool. Thereafter, at block 2216, the transformation programs are ranked. One or more of the ranked transformation programs are provided as transformation program suggestions or used to generate transformed data, as indicated at block 2218.

Figure 23:
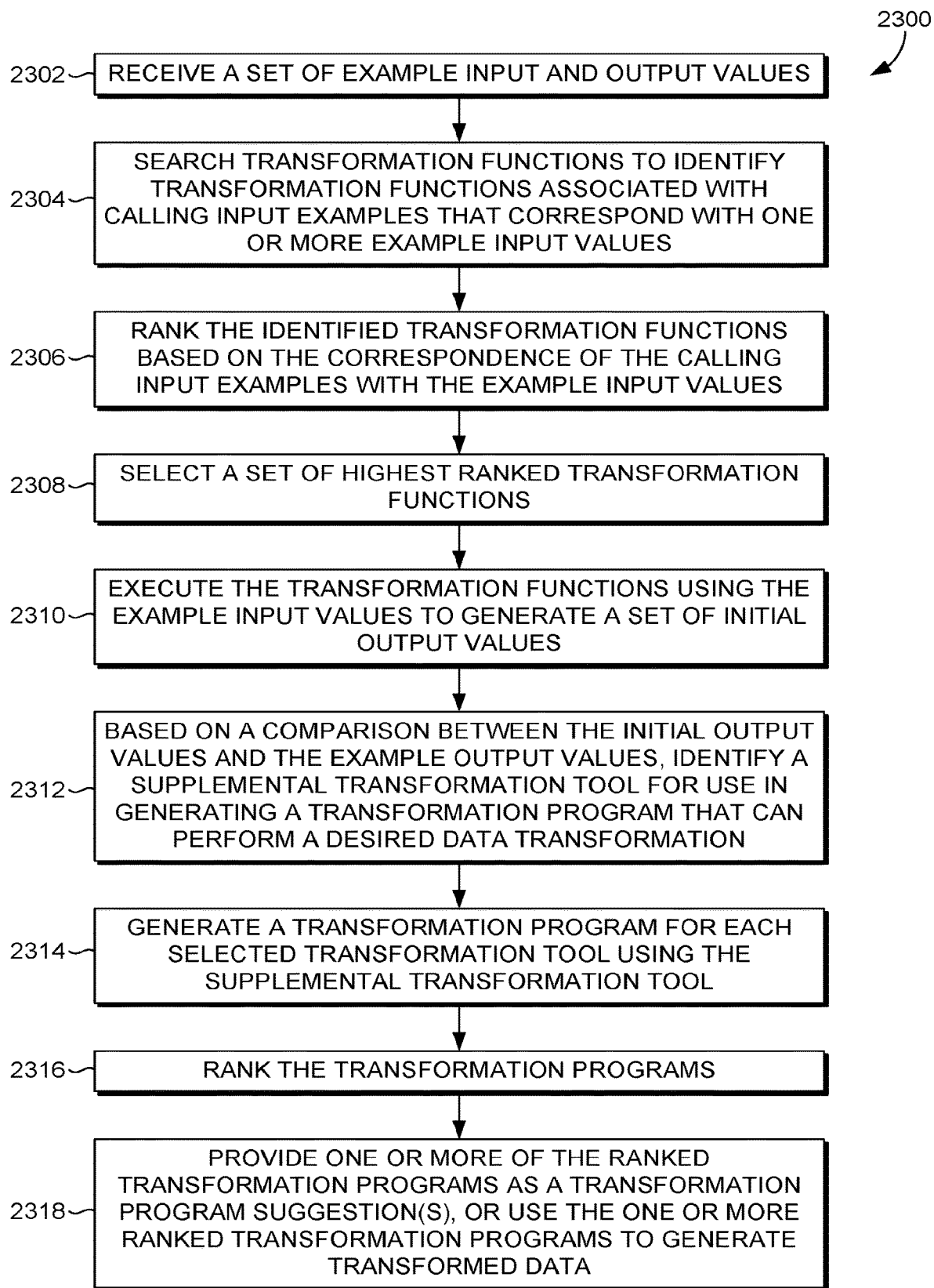
FIG. 23 is a flow diagram that illustrates an exemplary method for generating and providing transformation programs using transformation functions, in accordance with an aspect of the technology described herein.

With reference to FIG. 23, FIG. 23 provides a method 2300 for generating and providing transformation programs using transformation functions, in accordance with embodiments of the present invention. Initially, at block 2302, a set of example input and output values are received. In embodiments, example values can be received from a user device, for example, based on a user indication. At block 2304, transformation functions are searched to identify transformation functions associated with calling input examples that correspond (match or are similar to, for instance, within a similarity threshold) with one or more example input values. At block 2306, the identified transformation functions are ranked based on the correspondence of the calling input examples with the example input values. As can be appreciated, a comparison of output can additionally or alternatively be used to identify and/or rank relevant transformation functions. For instance, transformation functions can be ranked based on syntactic distance associated with the comparison of example values and calling examples, or patterns associated therewith. At block 2308, a set of highest ranked transformation functions are selected. For each of the selected transformation functions, the transformation functions are executed using the example input values to generate a set of initial output values. This is indicated at block 2310. Based on a comparison between the initial output values and the example output values, a supplemental transformation tool is identified or determined for use in generating a transformation program that can perform a desired data transformation. This is indicated at block 2312. Such a supplemental transformation tool may be a table tool, an operator tool, a service tool, a combination thereof, or the like. At block 2314, a transformation program is generated for each selected transformation tool using the supplemental transformation tool. Thereafter, at block 2316, the transformation programs are ranked. Such transformation programs can be ranked, for example, using tool attributes, such as the function popularity, function author, etc. One or more of the ranked transformation programs are provided as a transformation program suggestion(s) or used to generate transformed data, as indicated at block 2318.

Figure 24:
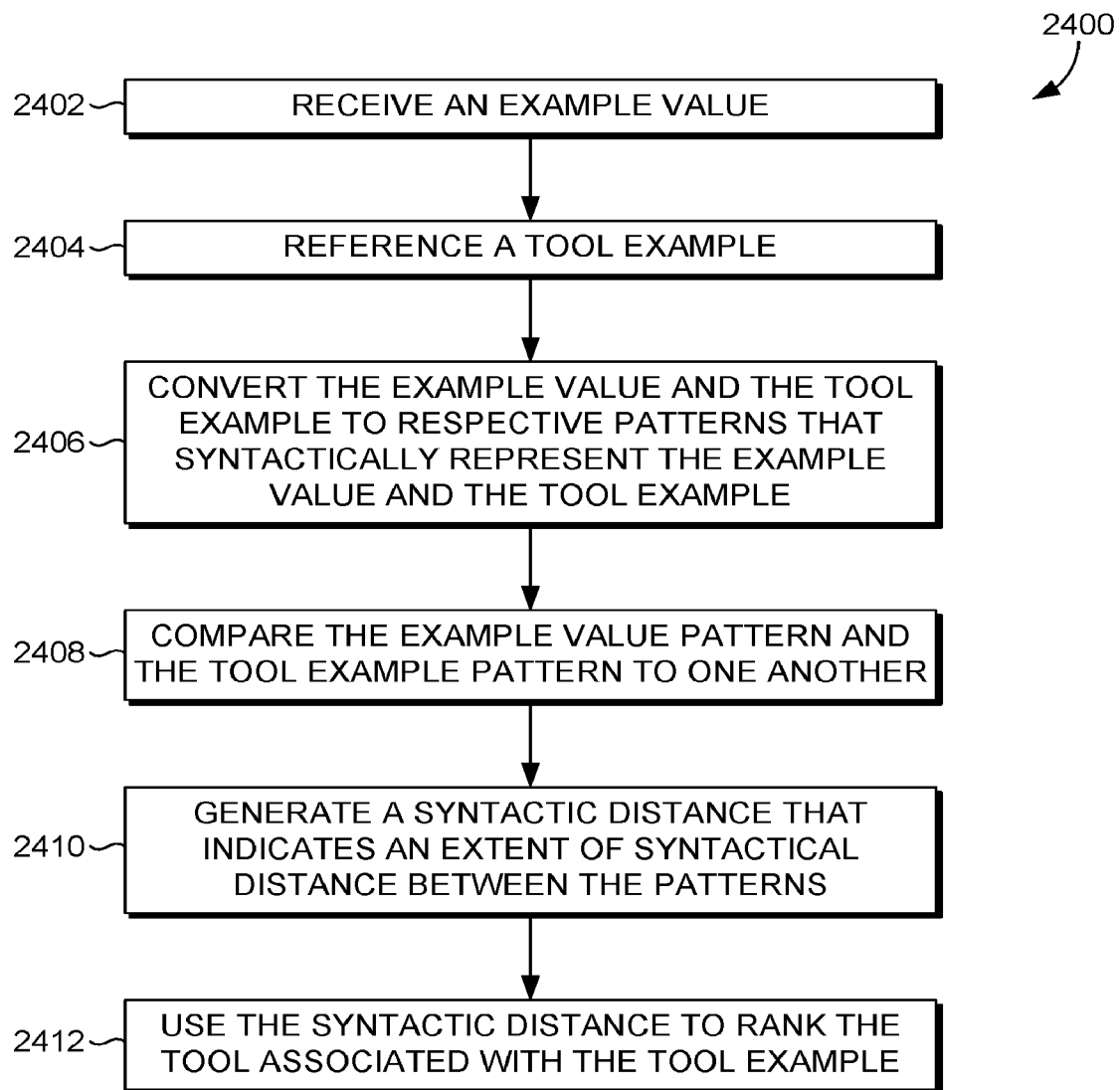
FIG. 24 is a flow diagram that illustrates an exemplary method for identifying relevant transformation tools using syntactic distance, in accordance with an aspect of the technology described herein.

Turning to FIG. 24, FIG. 24 provides one example of a method for identifying relevant transformation tools using syntactic distance, in accordance with embodiments of the present invention. Initially, at block 2402, an example value is received. At block 2404, a tool example is referenced. A tool example can be, for instance, a calling input example associated with a function. At block 2406, the example value and the tool example are converted to respective patterns that syntactically represent the example value and the tool example. As can be appreciated, although both the example value and tool example are described as being converted to patterns, in some cases, only the tool example or the example value might be converted to a pattern and used for a comparison. At block 2408, the example value pattern and the tool example pattern are compared to one another. Based on the comparison, at block 2410, a syntactic distance is generated that indicates an extent of syntactical distance between the patterns. At block 2412, the syntactic distance is used to rank the tool associated with the tool example. The ranked transformation tools can then be used to select a transformation tool to generate a transformation program.

Figure 25:
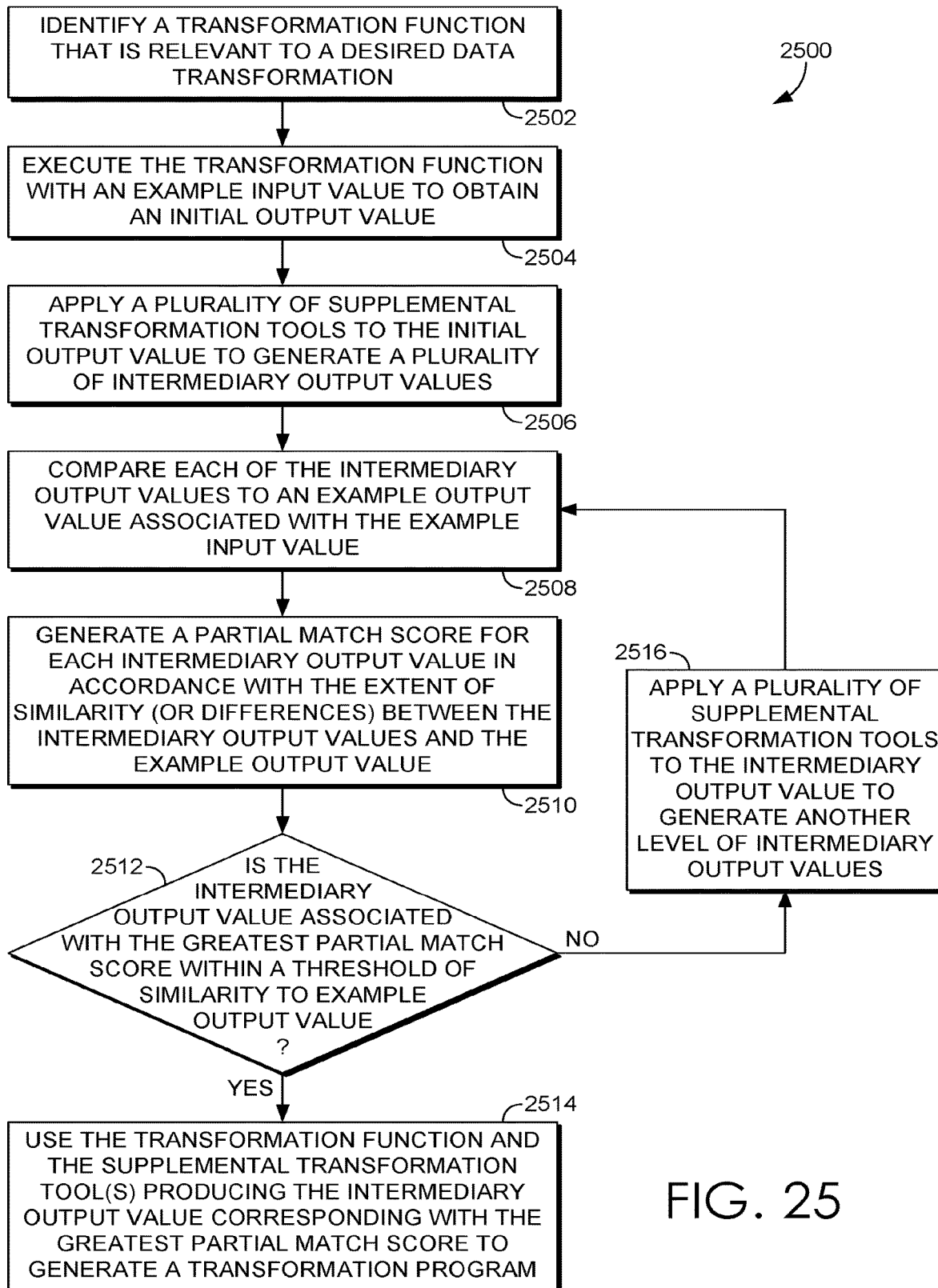
FIG. 25 is a flow diagram that illustrates an exemplary method for efficiently generating a transformation program, in accordance with an aspect of the technology described herein.

Now with reference to FIG. 25, FIG. 25 provides one example of a method for efficiently generating a transformation program, in accordance with embodiments of the present invention. Initially, at block 2502, a transformation function that is relevant to a desired data transformation is identified. Any manner of analysis may be performed to identify a relevant transformation function. At block 2504, the transformation function is executed with an example input value (e.g., provided by a user) to obtain an initial output value. At block 2506, a plurality of supplemental transformation tools are applied to the initial output value to generate a plurality of intermediary output values. Such supplemental transformation tools may include various tables, operators, and/or web services. At block 2508, each of the intermediary output values are compared to an example output value associated with the example input value. Based on the comparisons, at block 2510, a partial match score is generated for each intermediary output value in accordance with the extent of similarity (or differences) between the intermediary output values and the example output value. At block 2512, it is determined whether the intermediary output value associated with the greatest partial match score is within a threshold of similarity to example output value. For example, a partial match score exceeding a similarity threshold may be used to determine that the intermediary output value matches or corresponds with the example output value. If so, the transformation function and the supplemental transformation tool producing the intermediary output value corresponding with the greatest partial match score are used to generate a transformation program, as indicated at block 2514. On the other hand, if not, a plurality of supplemental transformation tools are applied to the intermediary output value to generate another level of intermediary output values. This is shown at block 2516. Thereafter, the method can iteratively repeat blocks 2508-2516 until a determination is made that the intermediary output value associated with the greatest partial match score is within a threshold of similarity to the example output value and a transformation program is generated in association therewith.

Exemplary Extensible Data Transformation Implementations

Figure 26:
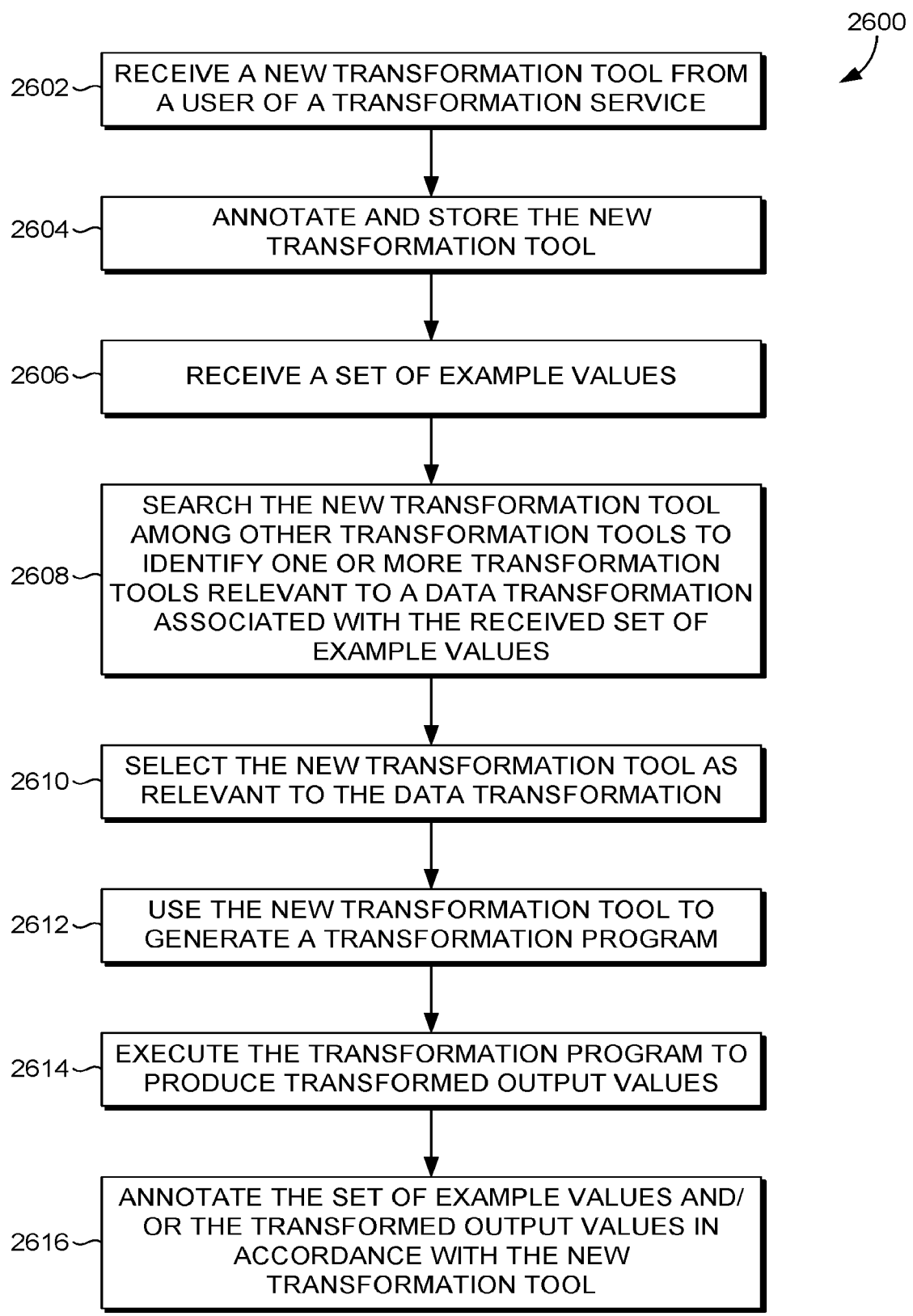
FIG. 26 is a flow diagram that illustrates an exemplary method for facilitating extensible data transformations, in accordance with an aspect of the technology described herein.
Figure 27:
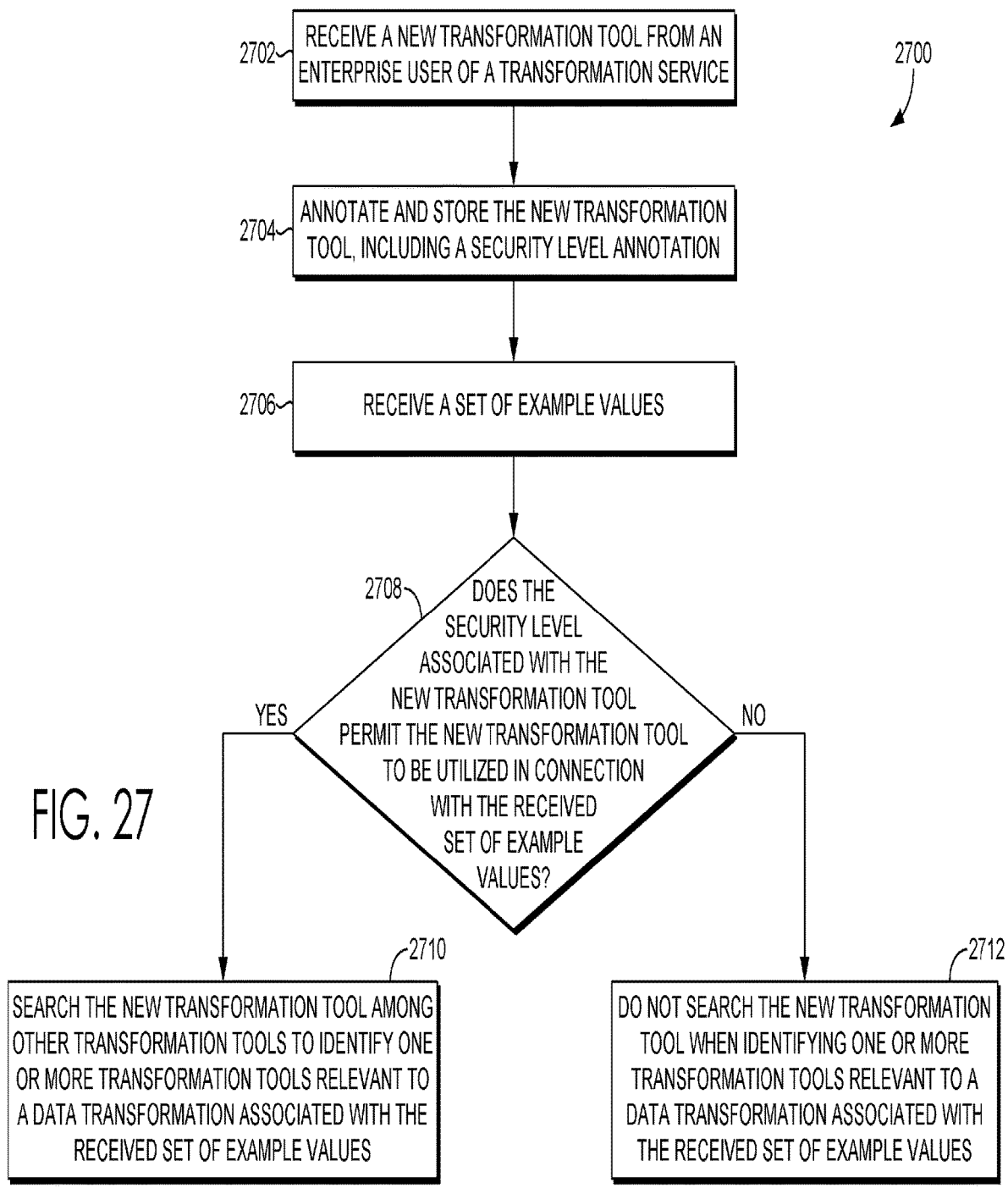
FIG. 27 is a flow diagram that illustrates another exemplary method for facilitating extensible data transformations, in accordance with an aspect of the technology described herein.

As described, various extensible data transformation implementations can be used in accordance with embodiments of the present invention. FIGS. 26-27 provide exemplary methods of implementing extensible data transformations, in accordance with various embodiments of the present invention. The methods 2600 and 2700 can be performed by a computer device, such as device 100 described previously. The flow diagrams represented in FIGS. 26-27 are intended to be exemplary in nature and not limiting.

Turning initially to FIG. 26, FIG. 26 provides a method 2600 for facilitating extensible data transformations, in accordance with embodiments of the present invention. Initially, at block 2602, a new transformation tool is received from a user of a transformation service. At block 2604, the new transformation tool is annotated and stored. Subsequently, at block 2606, a set of example values, such as example input and output values, are received. As can be appreciated, the set of example values can be received by the same user that provided the new transformation tool or another user of the transformation service. At block 2608, the new transformation tool is searched among other transformation tools to identify one or more transformation tools relevant to a data transformation associated with the received set of example values. At block 2610, the new transformation tool is selected as relevant to the data transformation. Thereafter, at block 2612, the new transformation tool is used to generate a transformation program. The transformation program is executed at block 2614 to produce transformed output values. In some cases, the transformation program might be provided as a suggestion, and upon selection, produce the transformed output values. At block 2616, the set of example values and/or the transformed output values are annotated in accordance with the new transformation tool. Such annotations can be used for subsequent analysis of the new transformation tool provided by the user.

With reference to FIG. 27, FIG. 27 provides a method 2700 for facilitating extensible data transformations, in accordance with embodiments of the present invention. Initially, at block 2702, a new transformation tool is received from an enterprise user of a transformation service. At block 2704, the new transformation tool is annotated and stored, including a security level annotation. Subsequently, at block 2706, a set of example values, such as example input and output values, are received. As can be appreciated, the set of example values can be received by the same user that provided the new transformation tool or another user of the transformation service. At block 2708, it is determined if the security level associated with the new transformation tool permits the new transformation tool to be utilized in connection with the received set of example values. If so, the new transformation tool is searched among other transformation tools to identify one or more transformation tools relevant to a data transformation associated with the received set of example values. As indicated at block 2710. If not, the new transformation tool is not searched when identifying one or more transformation tools relevant to a data transformation associated with the received set of example values, as shown at block 2712.

The technology described herein has been described in relation to particular aspects, which are intended in all respects to be illustrative rather than restrictive.

What is claimed is:

1. A computer-implemented method, comprising:
  causing a web crawler to obtain a set of transformation tools from a set of remote computer systems, a first transformation tool of the set of transformation tools, as a result of being executed, causes data to be converter from a first format to a second format;

storing the set of transformation tools in a data store in a repository accessible to a set of computer system providing a data transformation service;

obtaining data maintained in the first format;

receiving, at the data transformation service, an indication of the second format for the data to include in an data stream;

generating a determination that the first transformation tool is useable to transform the data from the first format to the second format;

causing a virtual machine, executed by a first computer system of the set of remote computer systems, to transform the data from the first format to the second format based on the first transformation tool; and outputting the data to the data stream.

2. The computer-implemented method of claim 1, wherein causing the virtual machine to transform the data further comprises generating source code based on the first transformation tool, where execution of the source code transforms at least a portion of the data from the first format to the second format.

3. The computer-implemented method of claim 2, causing the virtual machine to transform the data further comprises generating the source code based on a second transformation function, where the second transformation function transform at least one other portion of the data from the first format to the second format.

4. The computer-implemented method of claim 1, wherein the first format further comprises a schema for a table stored in a database.

5. The computer-implemented method of claim 1, wherein the computer-implemented method further comprises generating a second transformation tool of the set of transformation tools by at least analyzing a data source obtained by the web crawler and generating a mapping table associated with the date source.

6. The computer-implemented method of claim 5, wherein the mapping table further comprises source code that, as a result of being executed, converts from a third format to a fourth format.

7. The computer-implemented method of claim 1, wherein the indication is initiated by a user-provided input.

8. The computer-implemented method of claim 1, wherein obtaining the data maintained in the first format further comprises causing the web crawler to connect to a remote computer system that maintains the data in a database.

9. The computer-implemented method of claim 1, wherein the data stream is used at least in part, by a log service, to generate runtime log data.

10. A system, comprising:

a processor; and computer storage memory having computer-executable instructions stored thereon which, when executed by the processor, cause the system to:

generate a repository of transformation tools by at least causing a web crawler to:

obtain first data from a remote computer system;

determine a data format associated with the first data; and generating a mapping table to convert from the data format to at least one other format based on the data format;

obtain second data stored in an input format and an indication of an output format for the second data;

determine a transformation tool from the repository of transformation tools is usable to perform at least a portion of a transformation from the input format to the output format;

cause an isolated computer system to generate source code, based in part on the transformation tool, that, when executed, performs transforms the second data from the input format to the output format; and provide the second data in the output format to a data stream.

11. The system of claim 10, wherein the mapping table converts a semi-structured data to a relational data.

12. The system of claim 10, wherein the transformation tool includes the mapping table.

13. The system of claim 10, wherein the computer-executable instructions that cause the system to determine the transformation tool from the repository of transformation tools further include computer-executable instructions that, when executed by the processor, cause the system to perform a search the repository of transformation tools for transformation tools related to the input format.

14. The system of claim 13, further comprising providing suggestion of the transformation tool based on a result of the search.

15. One or more computer storage media having computer-executable instructions embodied thereon which, when executed by one or more processors, cause the one or more processors to perform a method comprising:

causing a web crawler to store a set of transformation tools obtained from a set of remote computer systems in a data store in a repository, a first transformation tool of the set of transformation tools generated based on a first format of data stored by a remote computer system of the set of remote computer systems;

obtaining first data maintained in the first format;

receiving an indication of a second format for the first data to include in an data stream;

generating a determination that the first transformation tool is useable to transform at least a portion the first data from the first format to the second format;

causing a virtual machine to transform the first data from the first format to the second format based on the first transformation tool; and outputting the first data to the data stream.

16. The one or more computer storage media of claim 15, wherein the first transformation tool is a script.

17. The one or more computer storage media of claim 16, wherein causing the virtual machine to transform the first data from the first format to the second format further comprises executing the script.

18. The one or more computer storage media of claim 15, wherein the computer-executable instructions further cause the one or more processors to generate a notification to a user based at least in part on the data stream.

19. The one or more computer storage media of claim 15, wherein the second data format is a structured data format.

20. The one or more computer storage media of claim 15, wherein the first transformation tool includes a mapping table to convert from the first format to the second format.

* * * * *